US008073216B2

(12) United States Patent
Dawant et al.

(10) Patent No.: US 8,073,216 B2
(45) Date of Patent: Dec. 6, 2011

(54) SYSTEM AND METHODS FOR AUTOMATIC SEGMENTATION OF ONE OR MORE CRITICAL STRUCTURES OF THE EAR

(75) Inventors: Benoit M. Dawant, Nashville, TN (US); Jack H. Noble, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 760 days.

(21) Appl. No.: 12/200,075

(22) Filed: Aug. 28, 2008

(65) Prior Publication Data
US 2009/0060308 A1 Mar. 5, 2009

Related U.S. Application Data

(60) Provisional application No. 60/966,806, filed on Aug. 29, 2007.

(51) Int. Cl.
*G06K 9/00* (2006.01)
(52) U.S. Cl. ...................................................... 382/128
(58) Field of Classification Search .................. 382/128, 382/130–133, 287–289, 293, 294, 259; 128/922; 600/416
See application file for complete search history.

(56) References Cited

U.S. PATENT DOCUMENTS
2007/0019846 A1* 1/2007 Bullitt et al. .................. 382/128

OTHER PUBLICATIONS

Robert F. Labadie et al., "Minimally Invasive, Image-Guided, Facial-Recess Approach to the Middle Ear: Demonstration of the Concept of Percutaneous Cochlear Access In Vitro," Otology & Neurotology, 2005, pp. 557-562, vol.26.
Robert Frederick Labadie et al., "Clinical Validation of Percutaneous Cochlear Implant Surgery: Initial Report," The Laryngoscope, 2008, pp. 1031-1039, vol. 118.
J. Michael Fitzpatrick et al., "Accuracy of Customized Miniature Stereotactic Platforms," Stereotactic and Functional Neurosurgery, 2005, pp. 25-31, vol. 83.
Jack H. Noble et al., "Determination of drill paths for percutaneous cochlear access accounting for target positioning error," Progress in Biomedical Optics and Imaging—Proceedings of SPIE, 2007, p. 650925, vol. 6509.
Jun Feng et al., "A 3D Geometric Deformable Model for Tubular Structure Segmentation," MMM, 10th International Multimedia Modelling Conference, 2004, p. 174.

(Continued)

*Primary Examiner* — Clayton E Laballe
*Assistant Examiner* — Autumn Parker
(74) *Attorney, Agent, or Firm* — Morris Manning & Martin, LLP; Tim Tingkang Xia, Esq.

(57) ABSTRACT

A system and method for automatic segmentation of a structure of interest of an ear are disclosed, where the structure of interest includes the facial nerve and chorda tympani. In one embodiment, the method combines an atlas-based approach with a minimum cost path finding algorithm. A structure model is constructed from a plurality of preoperative image volumes to have a centerline of the structure of interest in an atlas with each point along the centerline being associated with expected values for characteristic features, and used to create a spatially varying cost function that includes geometric information. A three-dimension minimum cost accumulating path is computed using the cost function, which is used to extract the centerline of the structure of interest. The centerlines are then expanded into the full structures using a level-set algorithm with a spatially-varying speed function, so as to segment of the structure of interest.

24 Claims, 9 Drawing Sheets

OTHER PUBLICATIONS

Peter J. Yim et al., "Vessel Surface Reconstruction With a Tubular Deformable Model," IEEE Transactions on Medical Imaging, Dec. 2001, pp. 1411-1421, vol. 20, No. 12.

Rashindra Manniesing et al., "Vessel Axis Tracking Using Topology Constrained Surface Evolution," IEEE Transactions on Medical Imaging, Mar. 2007, pp. 309-316, vol. 26, No. 3.

Stefan Wesarg et al., "Segmentation of Vessels: the Corkscrew Algorithm," Fraunhofer IGD, Cognitive Computing & Medical Imaging, Darmstadt, Germany, in SPIE Medical Imaging: Image Processing, A. Amini and A. Manduca, Eds. Bellingham, WA: SPIE, 2004, pp. 1609-1620, vol. 5370.

A. Santamaria-Pang et al., "Automatic Centerline Extraction of Irregular Tubular Structures Using Probability Volumes from Multiphoton Imaging," MICCAI 2007, 2007, pp. 486-494, Part II, LNCS 4792.

S.D. Olabarriaga et al., "Minimum Cost Path Algorithm for Coronary Artery Central Axis Tracking in CT Images," in MICCAI, R.E. Ellis and T.M. Peters, Eds., 2003, pp. 687-694, vol. 2879.

N. Hanssen et al., "Nerves-Level Sets for Interactive 3D Segmentation of Nerve Channels," Biomedical Imaging: Nano to Macro, 2004. IEEE International Symposium on, Apr. 2004, pp. 201-204, vol. 1.

Frederik Maes et al., "Multimodality Image Registration by Maximization of Mutual Information," IEEE Transactions on Medical Imaging, Apr. 1997, pp. 187-198, vol. 16, No. 2.

William M. Wells III et al., "Multi-Modal Volume Registration by Maximization of Mutual Information," pp. 1-20.

Kalman Palágyi et al., "A 3-D 6-subiteration thinning algorithm for extracting medial lines," Pattern Recognition Letters, 1998, pp. 613-627, vol. 19.

Gustavo K. Rohde et al., "The Adaptive Bases Algorithm for Intensity-Based Nonrigid Image Registration," IEEE Transaction Medical Imaging, Nov. 2003, pp. 1470-1479, vol. 22, No. 11.

E. W. Dijkstra, "A Note on Two Problems in Connexion with Graphs," Numerische Mathematik, 1959, pp. 269-271, vol. 1.

* cited by examiner

US 8,073,216 B2

SYSTEM AND METHODS FOR AUTOMATIC SEGMENTATION OF ONE OR MORE CRITICAL STRUCTURES OF THE EAR

CROSS-REFERENCE TO RELATED PATENT APPLICATION

This application claims priority to and the benefit of, pursuant to 35 U.S.C. §119(e), U.S. provisional patent application Ser. No. 60/966,806, filed Aug. 29, 2007, entitled "SYSTEM AND METHOD FOR AUTOMATIC SEGMENTATION OF ONE OR MORE CRITICAL STRUCTURES FOR PERCUTANEOUS COCHLEAR IMPLANTATION," by Benoit M. Dawant and Jack H. Noble, the content of which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference were individually incorporated by reference. In terms of notation, hereinafter, "[n]" represents the nth reference cited in the reference list. For example, [4] represents the 4th reference cited in the reference list, namely, J. H. Noble, F. M. Warren, R. F. Labadie, B. M. Dawant, J. M. Fitzpatrick, "Determination of drill paths for percutaneous cochlear access accounting for target positioning error," *Progress in Biomedical Optics and Imaging—Proceedings of SPIE*, v 6509, p 650925, 2007.

STATEMENT OF FEDERALLY-SPONSORED RESEARCH

This invention was made with Government support under Contract Nos. 1R01-DC008408, 1R01-EB006193 and 1F31-DC009791, awarded by the National Institutes of Health. The government has certain rights in the invention.

FIELD OF THE INVENTION

The present invention relates to generally to cochlear implantation, and more particularly to methods of automatic segmentation of one or more critical structures using spatially dependent feature values for percutaneous cochlear implantation and a system of implementing same.

BACKGROUND OF THE INVENTION

Cochlear implantation is a surgical procedure performed on individuals who experience profound to severe sensorineural hearing loss. In cochlear implant (CI) surgery, an electrode array is permanently implanted into the cochlea by threading the array into the basal turn, as shown in FIG. 2. The array is connected to a receiver mounted securely under the skin behind the patient's ear. When activated, the external processor senses sound, decomposes it (usually involving Fourier analysis), and digitally reconstructs it before sending the signal through the skin to the internal receiver, which then activates the appropriate intracochlear electrodes causing stimulation of the auditory nerve and the perception of hearing. Current methods of performing the surgery require wide excavation of the mastoid region of the temporal bone. This excavation procedure is necessary to safely avoid damaging sensitive structures but requires surgical time of at least 2 hours. Recently another approach has been proposed—percutaneous cochlear access—in which a single hole is drilled on a straight path from the skull surface to the cochlea [1,2]. The advantages of this technique are time saving and uniform insertion of the electrode array, which may be less damaging to inner ear anatomy.

Percutaneous cochlear access is accomplished by using preoperative CT images to plan an appropriate drilling trajectory from which a drill guide is rapid-prototyped. Prior to surgery, in the clinic, anchors are affixed to the patient's skull by creating three small skin incisions and screwing self-tapping anchors into the bone. The incisions are stitched over the anchors, and a CT image of the patient is acquired. Using the image, a safe direct drilling trajectory from the skin surface to the cochlea is then selected. The anchors are localized, and a unique platform, which is used as a drill guide, for example, STarFix™ microTargeting™ Platform (FHC, Inc., Bowdoin, Me.), is manufactured for each patient using software designed to mathematically relate the location of the bone markers to the trajectory. On the day of surgery, the platform is mounted on the anchors and the drill is mounted on the guide. FIG. 3 shows a picture of the platform mounted on a patient's skull with a drill bit in place.

One major difficulty with the percutaneous approach is the selection of a safe drilling trajectory. The preferred trajectory passes through the facial recess, a region approximately 1.0-3.5 mm in width bounded posteriorly by the facial nerve and anteriorly by the chorda tympani, as shown in FIG. 2. The facial nerve, a tubular structure approximately 1.0-1.5 mm in diameter (about 3 voxels), is a highly sensitive structure that controls all movement of the ipsilateral face. If damaged, the patient may experience temporary or permanent facial paralysis. The chorda is a tubular structure approximately 0.3-0.5 mm in diameter (about 1 voxel). If the chorda is damaged, the patient may experience loss in the ability to taste. In the previous work studying the safety of CI drilling trajectories, in which error of the drill guide system was taken into account [4], it is determined that safe trajectories planned for 1 mm diameter drill bits generally need to lie at least 1 mm away from both the facial nerve and the chorda. Fitting a trajectory in the available space can thus be difficult, and any planning error can have serious consequences.

During the planning process, the physician selects the drilling trajectory in the patient CT by examining the position of the trajectory with respect to the sensitive structures in 2D CT slices. This is difficult, even for experienced surgeons, because the size of the facial nerve and chorda and their curved shape makes them difficult to follow from slice to slice. The planning process would be greatly facilitated if these structures could be visualized in 3D, which requires segmentation. Segmentation of these structures is also necessary to implement techniques for automatically planning safe drilling trajectories for CI surgery [4].

Atlas-based segmentation is a common technique, which relies on image registration, to perform automatic segmentation of general structures in medical images. But one underlying assumption on which these methods are based is that the volumes to be registered are topologically equivalent. Even when this is the case, these methods are challenged by applications in which lack of local contrast makes intensity similarity measures used to drive the algorithms ineffectual. In the percutaneous cochlear implementation, both the lack of local contrast and topological differences are issues. Indeed, the facial nerve and chorda are surrounded by structures of comparable intensity values and pneumatized bone. Pneumatized bone appears as voids within the bone, which can be vary in number and location across subjects. Because of these characteristics, atlas-based methods alone do not lead to results that are accurate enough.

FIGS. 4 and 5 show that purely intensity based segmentation methods are unlikely to be successful. Difficulties include partial volume effects due to the size of the structure, lack of clearly defined edges, and changes in the intensity characteristics along the structures' length (dark in some section and bright in other sections). One notes that the structures of interest are tubular, and a large body of literature has been published to segment this type of structure [5-11]. Among these methods, a minimal cost path based approach [9-11] extracts the structure centerline as the path of minimum cost from a starting to an ending point through the image. Typically, the cost function used to associate a cost to every connection between neighboring voxels involves terms derived from the image, such as intensity value or gradient. In general, however, the cost function is spatially invariant, i.e., it is computed the same way over the entire image. Spatial invariance is a severe limitation for the percutaneous cochlear implementation because the intensity characteristics of the structures of interest vary along the structures. Additionally, these methods also do not use a-priori geometric information, which is also a limitation for the percutaneous cochlear implementation because the path of minimum cost, based on intensity values alone, does not always correspond to the structure centerline.

Therefore, a heretofore unaddressed need exists in the art to address the aforementioned deficiencies and inadequacies.

SUMMARY OF THE INVENTION

In one aspect, the present invention relates to a method for automatic segmentation of a structure of interest from a target image volume T containing the structure of interest for percutaneous cochlear implantation. The structure of interest comprises the facial nerve and the chorda tympani of a living subject. The target image volume is characterized with a plurality of voxels.

In one embodiment, the method includes the steps of:
(a) providing a statistical model of the structure of interest, where the statistical model comprises a centerline of the structure of interest in an atlas A with each point along the centerline being associated with expected values for characteristic features, and where the characteristic features comprise a structure width $E_W$, a centerline intensity $E_I$, and a centerline curve orientation $E_O$;
(b) affinely registering the target image T to the atlas A and a sub-image of the atlas $A^E$ that contains only a region of interest (ROI), so as to obtain a registered target image T' and an affine transformation $\tau^a$;
(c) obtaining a transformation $\tau^n$ for a non-rigid registration between the registered target image T' and the atlas sub-volume $A^E$;
(d) associating each voxel v in the registered target image T' with the expected feature values of the characteristic features in the atlas A using the transformation $\tau^n$;
(e) computing a cost matrix at each voxel v that measures the difference between the expected feature values and the feature values computed from the registered target image T' at the voxel v, and characterizes costs for all voxel connections in the registered target image T';
(f) localizing a starting point and an ending point for the structure of interest in the registered target image T';
(g) computing a centerline of the structure of interest in the registered target image T' with a minimum cost path algorithm using the cost matrix, the starting point and the ending point;
(h) extracting a full structure of the structure of interest in the registered target image T' by deforming the computed centerline of the structure of interest with a level set algorithm; and
(i) projecting the extracted full structure in the registered target image T' onto the target image volume T using the affine transformation $\tau^a$, so as to obtain the segmentation of the structure of interest in the target image volume T.

In another aspect, the present invention relates to a system for automatic segmentation of a structure of interest from a target image volume T containing the structure of interest for percutaneous cochlear implantation. The structure of interest comprises the facial nerve and the chorda tympani of a living subject. The target image volume is characterized with a plurality of voxels. In one embodiment, the system has a controller configured to perform functions of:
(a) providing a statistical model of the structure of interest, where the statistical model comprises a centerline of the structure of interest in an atlas A with each point along the centerline being associated with expected values for characteristic features, and where the characteristic features comprise a structure width $E_W$, a centerline intensity $E_I$, and a centerline curve orientation $E_O$;
(b) affinely registering the target image T to the atlas A and a sub-image of the atlas $A^E$ that contains only a region of interest (ROI), so as to obtain a registered target image T' and an affine transformation $\tau^a$;
(c) obtaining a transformation $\tau^n$ for a non-rigid registration between the registered target image T' and the atlas sub-volume $A^E$;
(d) associating each voxel v in the registered target image T' with the expected feature values of the characteristic features in the atlas A using the transformation $\tau^n$;
(e) computing a cost matrix at each voxel v that measures the difference between the expected feature values and the feature values computed from the registered target image T' at the voxel v, and characterizes costs for all voxel connections in the registered target image T';
(f) localizing a starting point and an ending point for the structure of interest in the registered target image T';
(g) computing a centerline of the structure of interest in the registered target image T' with a minimum cost path algorithm using the cost matrix, the starting point and the ending point;
(h) extracting a full structure of the structure of interest in the registered target image T' by deforming the computed centerline of the structure of interest with a level set algorithm; and
(i) projecting the extracted full structure in the registered target image T' onto the target image volume T using the affine transformation $\tau^a$, so as to obtain the segmentation of the structure of interest in the target image volume T.

In yet another aspect, the present invention relates to software stored on a computer readable medium for causing a computing system to perform functions that automatically segment a structure of interest from a target image volume T containing the structure of interest for percutaneous cochlear implantation, where the structure of interest comprises the facial nerve and the chorda tympani of a living subject, and where the target image volume is characterized with a plurality of voxels. In one embodiment, the functions include:
(a) providing a statistical model of the structure of interest, where the statistical model comprises a centerline of the structure of interest in an atlas A with each point along the centerline being associated with expected values for characteristic features, and where the characteristic features comprise a structure width $E_W$, a centerline intensity $E_I$, and a centerline curve orientation $E_O$;

(b) affinely registering the target image T to the atlas A and a sub-image of the atlas $A^E$ that contains only a region of interest (ROI), so as to obtain a registered target image T' and an affine transformation $\tau^a$;

(c) obtaining a transformation $\tau^n$ for a non-rigid registration between the registered target image T' and the atlas sub-volume $A^E$;

(d) associating each voxel v in the registered target image T' with the expected feature values of the characteristic features in the atlas A using the transformation $\tau^n$;

(e) computing a cost matrix at each voxel v that measures the difference between the expected feature values and the feature values computed from the registered target image T' at the voxel v, and characterizes costs for all voxel connections in the registered target image T';

(f) localizing a starting point and an ending point for the structure of interest in the registered target image T';

(g) computing a centerline of the structure of interest in the registered target image T' with a minimum cost path algorithm using the cost matrix, the starting point and the ending point;

(h) extracting a full structure of the structure of interest in the registered target image T' by deforming the computed centerline of the structure of interest with a level set algorithm; and (i) projecting the extracted full structure in the registered target image T' onto the target image volume T using the affine transformation $\tau^a$, so as to obtain the segmentation of the structure of interest in the target image volume T.

In a further aspect, the present invention relates to a method for automatic segmentation of a structure of interest of a living subject from a target image volume, T, containing the structure of interest, where the target image volume T is characterized with a plurality of voxels. In one embodiment, the method includes the step of providing a statistical model of the structure of interest, where the statistical model comprises a centerline of the structure of interest in an atlas, A, with each point along the centerline being associated with expected values for characteristic features, and where the characteristic features comprise a structure width $E_W$, a centerline intensity $E_I$, and a centerline curve orientation $E_O$.

In yet a further aspect, the present invention relates to a system for automatic segmentation of a structure of interest of a living subject from a target image volume, T, containing the structure of interest, where the target image volume T is characterized with a plurality of voxels. The system has a controller configured to perform functions of:

(a) providing a statistical model of the structure of interest, where the statistical model comprises a centerline of the structure of interest in an atlas, A, with each point along the centerline being associated with expected values for characteristic features, and where the characteristic features comprise a structure width $E_W$, a centerline intensity $E_I$, and a centerline curve orientation $E_O$;

(b) affinely registering the target image T to the atlas A and a sub-image of the atlas $A^E$ that contains only a region of interest (ROI), so as to obtain a registered target image T' and an affine transformation $\tau^a$;

(c) obtaining a transformation $\tau^n$ for a non-rigid registration between the registered target image T' and the atlas sub-volume $A^E$;

(d) projecting the centerline of the structure of interest in the atlas A onto the registered target image T' using the transformation $\tau^n$ so as to associate each voxel v in the registered target image T' with the expected feature values of the characteristic features in the atlas A;

(e) performing a centerline segmentation of the structure of interest in the registered target image T' by a minimum cost path algorithm using a cost matrix that determines the least cost accumulating path from a start voxel to an end voxel in the registered target image T'; and (f) performing a full structure segmentation of the structure of interest in the registered target image T' by deforming the centerline segmentation of the structure of interest.

In one aspect, the present invention relates to software stored on a computer readable medium for causing a computing system to perform functions that automatically segment a structure of interest from a target image volume T containing the structure of interest for percutaneous cochlear implantation, and where the target image volume is characterized with a plurality of voxels. The functions include:

(a) providing a statistical model of the structure of interest, where the statistical model comprises a centerline of the structure of interest in an atlas, A, with each point along the centerline being associated with expected values for characteristic features, and where the characteristic features comprise a structure width $E_W$, a centerline intensity $E_I$, and a centerline curve orientation $E_O$;

(b) affinely registering the target image T to the atlas A and a sub-image of the atlas $A^E$ that contains only a region of interest (ROI), so as to obtain a registered target image T' and an affine transformation $\tau^a$;

(c) obtaining a transformation $\tau^n$ for a non-rigid registration between the registered target image T' and the atlas sub-volume $A^E$;

(d) projecting the centerline of the structure of interest in the atlas A onto the registered target image T' using the transformation $\tau^n$ so as to associate each voxel v in the registered target image T' with the expected feature values of the characteristic features in the atlas A;

(e) performing a centerline segmentation of the structure of interest in the registered target image T' by a minimum cost path algorithm using a cost matrix that determines the least cost accumulating path from a start voxel to an end voxel in the registered target image T'; and (f) performing a full structure segmentation of the structure of interest in the registered target image T' by deforming the centerline segmentation of the structure of interest.

In another aspect, the present invention relates to a method for automatic segmentation of a structure of interest of a living subject from a target image volume containing the structure of interest. In one embodiment, the method has the steps of providing a statistical model of the structure of interest, wherein the statistical model comprises a centerline of the structure of interest in an atlas A with each point along the centerline being associated with expected values for characteristic features, registering the target image to the atlas so as to obtain a registered target image that contains priori structure information of the structure of interest stored in the structure model, projecting the centerline of the structure of interest in the atlas onto the registered target image so as to associate each voxel in the registered target image with the expected feature values of the characteristic features in the atlas, extracting a centerline of the structure of interest in the registered target image by a minimum cost path algorithm, and expanding the extracted centerline into a full structure of the structure of interest in the registered target image using a level-set algorithm.

In yet another aspect, the present invention relates to a system having a controller for automatic segmentation of a structure of interest of a living subject from a target image volume containing the structure of interest. The controller is configured to perform functions of providing a statistical model of the structure of interest, wherein the statistical model comprises a centerline of the structure of interest in an atlas A with each point along the centerline being associated with expected values for characteristic features, registering the target image to the atlas so as to obtain a registered target image that contains priori structure information of the structure of interest stored in the structure model, projecting the centerline of the structure of interest in the atlas onto the registered target image so as to associate each voxel in the registered target image with the expected feature values of the characteristic features in the atlas, extracting a centerline of the structure of interest in the registered target image by a minimum cost path algorithm, and expanding the extracted centerline into a full structure of the structure of interest in the registered target image using a level-set algorithm.

In a further aspect, the present invention relates to software stored on a computer readable medium for causing a computing system to perform functions that automatically segment a structure of interest of a living subject from a target image volume containing the structure of interest. In one embodiment, the functions include providing a statistical model of the structure of interest, wherein the statistical model comprises a centerline of the structure of interest in an atlas A with each point along the centerline being associated with expected values for characteristic features, registering the target image to the atlas so as to obtain a registered target image that contains a-priori structure information of the structure of interest stored in the structure model, projecting the centerline of the structure of interest in the atlas onto the registered target image so as to associate each voxel in the registered target image with the expected feature values of the characteristic features in the atlas, extracting a centerline of the structure of interest in the registered target image by a minimum cost path algorithm, and expanding the extracted centerline into a full structure of the structure of interest in the registered target image using a level-set algorithm.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
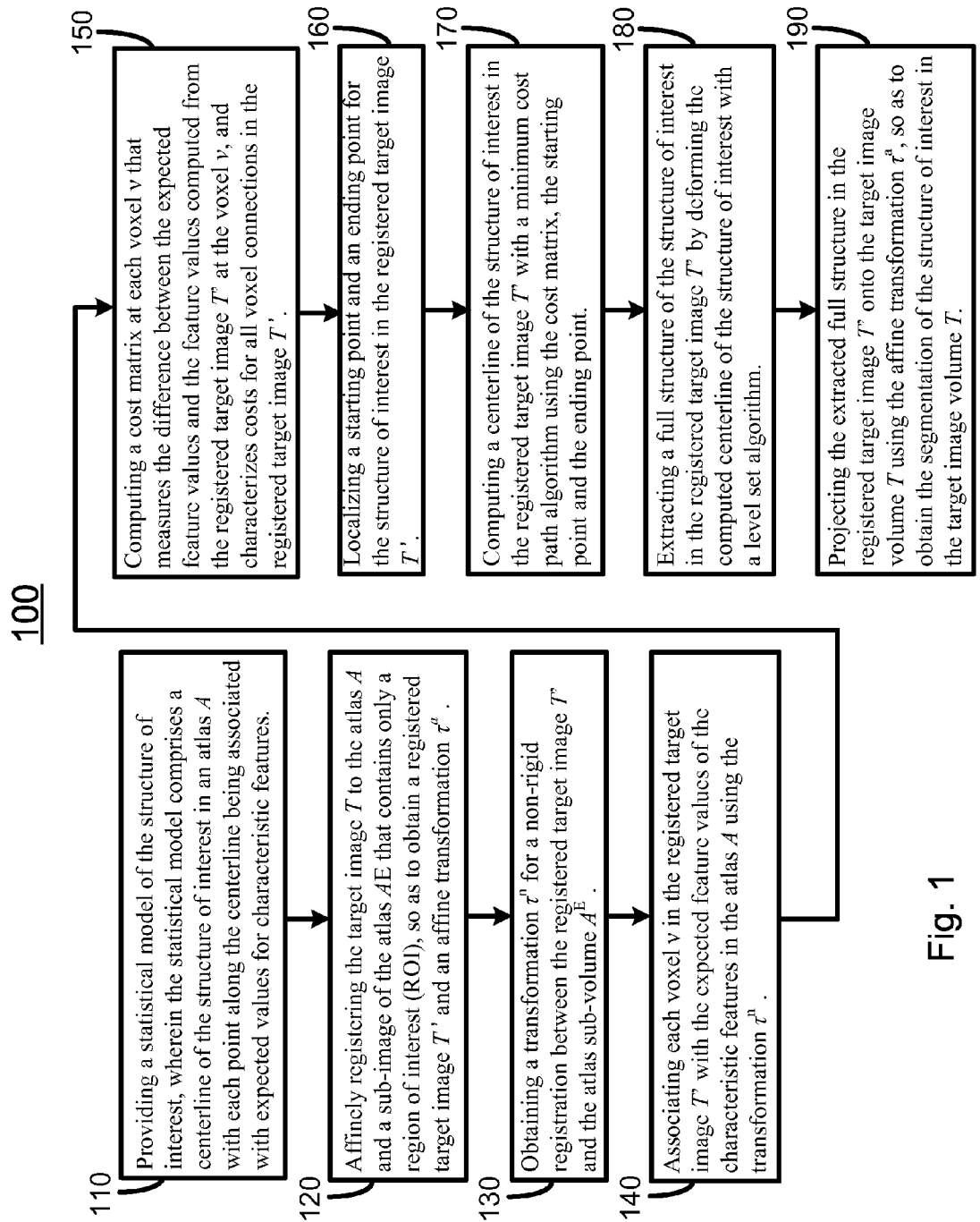
FIG. 1 shows a method for automatic segmentation of a structure of interest according to one embodiment of the present invention.
Figure 2:
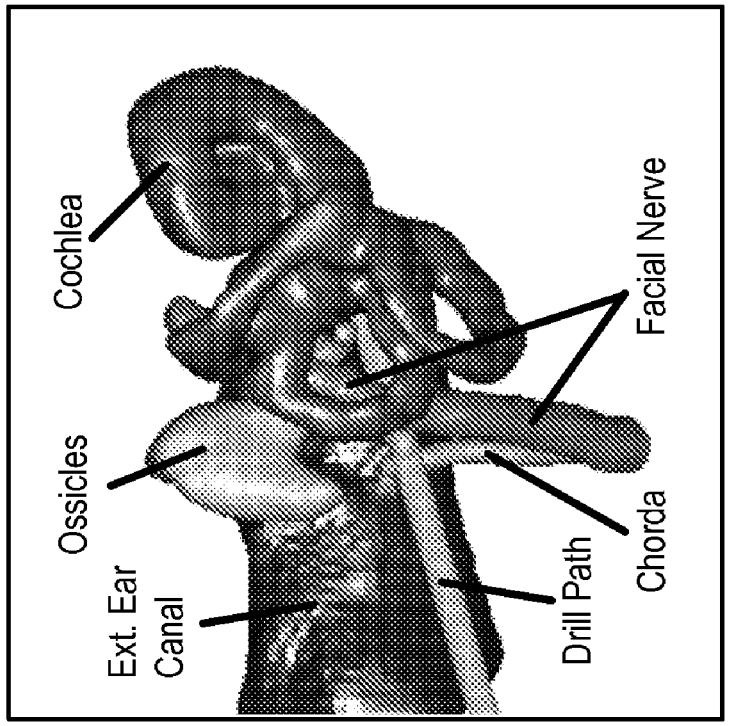
FIG. 2 shows a 3D rendering of the structures of the left ear. (a) Left-right, Posterior-Anterior view along the preferred drilling trajectory. The round window is located at the basal turn of the cochlea, while the facial recess is located at the depth of the facial nerve. (b) Posterior-Anterior view. The external ear canal includes the tympanic membrane.
Figure 2:
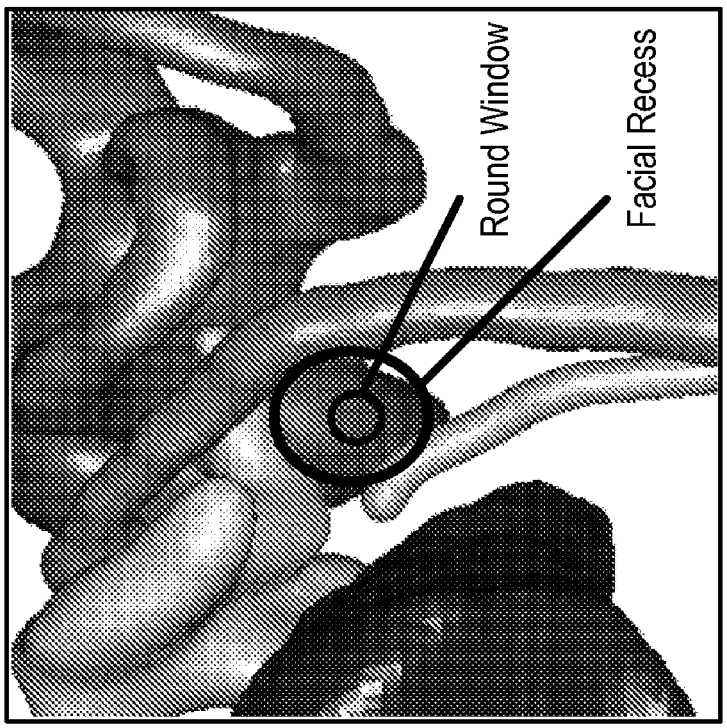
Figure 3:
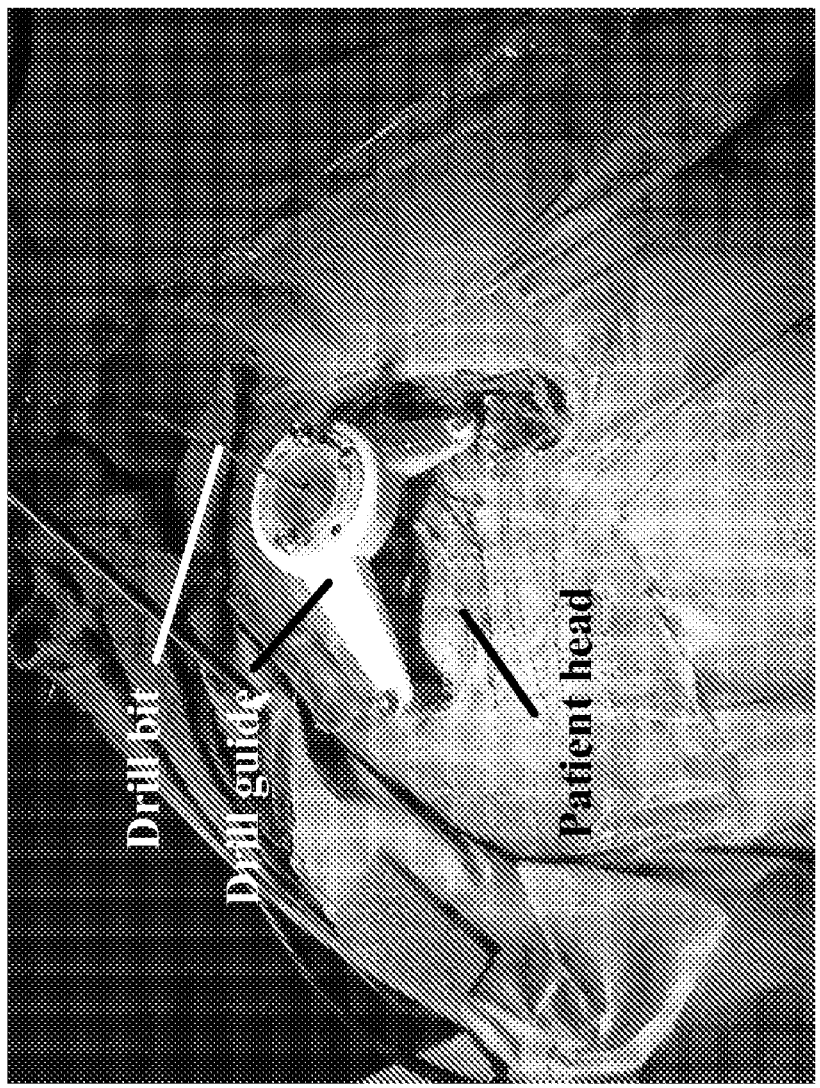
FIG. 3 is a picture taken during clinical testing of percutaneous CI method. It shows a drill guide fixed to anchors implanted in a human skull.
Figure 4:
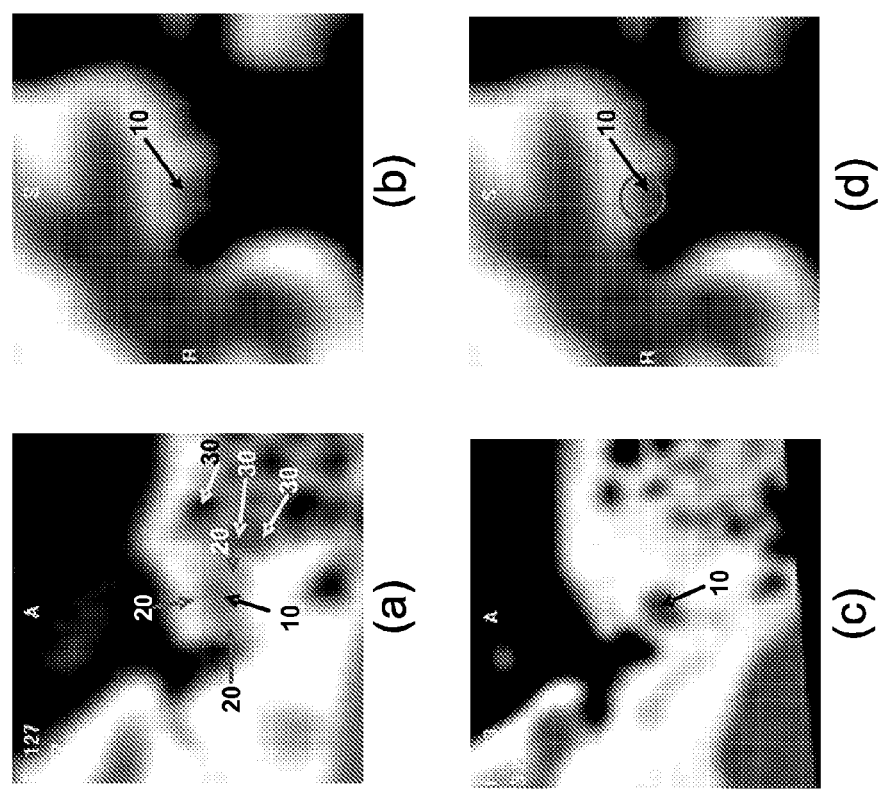
FIG. 4 illustrates the complexity of the problem. The facial nerve is pointed by the arrows 10. Adjacent similar intensity structures are is pointed by the arrows 20. Voidous pockets are is pointed by the arrows 30. Inter-patient variation can be seen between patient 10 (a) and patient 1 (c) in axial view—many adjacent structures in (a) do not appear in (c). (b) and (d) show a portion of the nerve in patient 1 which lacks adequate contrast with the background in the coronal view.
Figure 5:
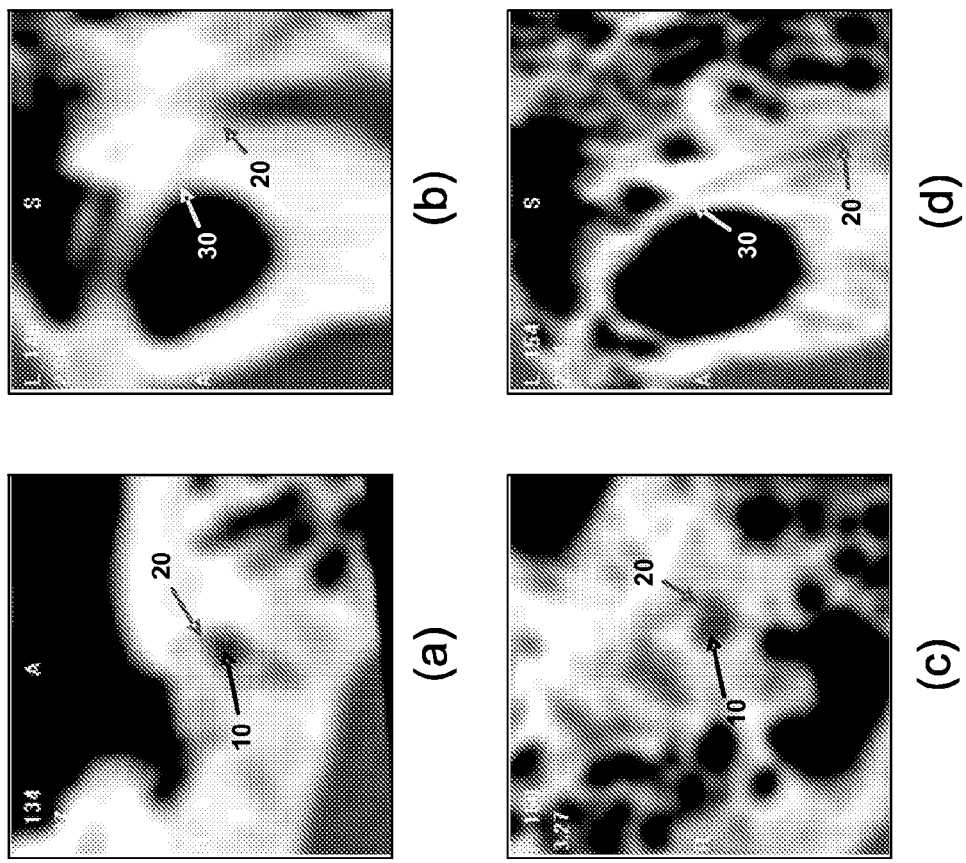
FIG. 5 illustrates the shape variation of the chorda between two patients with highly visible anatomy. Patient 1 (a) and (b) and 2 (c) and (d) in axial (a) and (c) and sagittal (b) and (d) view. The arrows 10 indicate facial nerve. The arrows 20 show the chorda at its branch from facial nerve. The arrows 30 show the chorda exiting tympanic bone. The chorda structure is seen as a dark rift between arrows 30 and 20. Chorda 1 branches from the facial nerve on the anterior rather than lateral face, and approximately 5 mm more superior relative to other anatomy than chorda 2. The angle between chorda 1 and the superior axis is wider and structure length visibly shorter than chorda 2.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

DEFINITIONS

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "living subject" refers to a human being such as a patient, or an animal such as a lab testing rat, gerbil, monkey or the like.

The term "cochlear implant", as used herein, refers to a device that is placed into scala tympani of a cochlea to provide sound perception for deaf or hearing impaired individuals.

The term "segmentation", as used herein, refers to a process of partitioning an image into multiple regions. Segmentation of an image is to simplify and/or change the representation of an image into something that is more meaningful and easier to analyze. Image segmentation is typically used to locate objects and boundaries (lines, curves, etc.) in images. The result of image segmentation is a set of regions that collectively cover the entire image, or a set of contours extracted from the image. Each of the pixels in a region are similar with respect to some characteristic or computed property, such as color, intensity, or texture. Adjacent regions are significantly different with respect to the same characteristic(s).

The term "affine", which is a noun, as used herein, refers to of or pertaining to a transformation that maps parallel lines to parallel lines and finite points to finite points. Affinely is an adjective corresponding to the noun "affine".

OVERVIEW OF THE INVENTION

In accordance with the purposes of this invention, as embodied and broadly described herein, this invention, in one aspect, relates to a method for the automatic segmentation of one or more critical structures of the ear, which may be related to percutaneous cochlear implantation, such as the facial nerve and the chorda tympani.

In cochlear implant surgery, an electrode array is permanently implanted in the cochlea to stimulate the auditory nerve and allow deaf people to hear. Current surgical techniques for cochlear access require wide excavation of the mastoid region of the temporal bone and a period of one to three hours to avoid damage to vital structures. Recently a far less invasive approach has been developed, namely, percutaneous cochlear access, in which a single hole is drilled from the skull surface to the cochlea. The drill path is determined by choosing an entry and target point on a pre-operative CT. For the surgical method to be effective, determination of a safe and effective drilling trajectory should be accomplished. Segmentation of the structures of the ear would improve trajectory planning safety and efficiency, and enable the possibility of automated planning. Two important structures of the ear, the facial nerve and chorda tympani, present difficulties in intensity based segmentation due to their diameter (as small as 1.0 and 0.4 mm) and adjacent inter-patient variable structures of similar intensity in CT imagery. A multipart model-based segmentation algorithm is disclosed herein, which accomplishes automatic segmentation of the facial nerve and chorda tympani. Segmentation results are presented and compared to surfaces manually segmented by an experienced physician. These results show that the method disclosed here is robust and accurate.

To achieve consistent segmentation accuracy, some amount of a-priori information needs to be brought into the process. To do so, statistical structure models are created by registration of image volumes. These models are then used at the time of segmentation to guide both an optimal path finding algorithm for structure centerline segmentation and a level set based algorithm for full structure segmentation.

Atlas-based segmentation methods use image registration to perform segmentation. One volume (the atlas) is segmented, possibly by hand, and this atlas is registered to the volume to be segmented. Labels assigned to any voxel in the atlas can thus be projected to a corresponding voxel in a target image volume. If registration is perfectly accurate, segmentation is a byproduct of registration. Unfortunately, the lack of contrast, the small size of the structure of interest, and the inter-patient variability in the region of interest in the application presented herein reduce the achievable registration accuracy below an acceptable level. Fortunately, the registration accuracy is sufficient to provide a shape and intensity based algorithm, which operates on the patient image, with a-priori statistical information that complements the information available directly from the target image. By combining these two sources of information, a fully automatic method to segment both the facial nerve and the chorda is designed, implemented, and tested according to the present invention. The remainder of this disclosure describes the invention in more detail. First, a statistical model of a structure of interest (a structure model) is created from a series of image volumes. Then, the information provided by the structure model is combined with intensity information of a target image volume and used with an optimal path finding algorithm to segment the centerlines of the facial nerve and the chorda in the target image volume. To complete the full structure segmentation, a level-set approach is implemented using the centerline as an initialization (an initial contour of the facial nerve and the chorda). The priors information provided by the structure model is also used in a speed function that specifies the speed at which the contour evolves along its normal direction.

Referring to FIG. 1, a method 100 for automatic segmentation of a structure of interest from a target image volume T containing the structure of interest for percutaneous cochlear implantation is shown according to one embodiment of the present invention. The structure of interest comprises the facial nerve and the chorda tympani of a living subject. The target image volume is characterized with a plurality of voxels.

In one embodiment, the method 100 includes the following steps: At step 110, a statistical model of the structure of interest is provided. The statistical model has a centerline of the structure of interest in an atlas A with each point along the centerline being associated with expected values for characteristic features. The characteristic features comprise a structure width $E_W$, a centerline intensity $E_I$, and a centerline curve orientation $E_O$.

The statistical model of the structure of interest is constructed from a plurality of image volumes (training image data) pre-operatively acquired from the heads of a plurality of living subjects as follows: at first, one image volume is chosen from the plurality of image volumes as an atlas. Second, each of the remaining image volumes of the plurality of image volumes is aligned to the atlas to correct differences in scale and orientation between the remaining image volumes. In one embodiment, the aligning step is performed by downsampling an image volume to be registered by a factor of four in each dimension, computing a transformation between the image volume and the atlas using a mutual information-based algorithm so as to initially align the image volume with the atlas, manually identifying the ROI in the atlas, cropping the image volume in the ROI, and registering the cropped image to the ROI of the atlas using the computed transformation at a full resolution.

Third, a structure of interest is manually segmented in each of the atlas and the remaining image volumes to produce corresponding binary structure masks, and a centerline of the structure of interest is extracted from the corresponding binary structure mask in each of the atlas and the remaining image volumes. In one embodiment, the centerline of the structure of interest is extracted with a topology preserving voxel thinning algorithm. Values of the characteristic features are then estimated for each voxel along the centerline of the structure of interest in each of the atlas and the remaining image volumes.

Next, the atlas is registered to each of the remaining image volumes using an intensity-based non-rigid registration algorithm to obtain a corresponding non-rigid transformation, and each point on the centerline of the structure of interest in the atlas is projected onto each of the remaining image volumes using the corresponding non-rigid transformation to establish a correspondence between each projected point and its closest point on the centerline of the structure of interest in each of the remaining image volumes.

Then, the values of the characteristic features are averaged for each point on the centerlines of the structure of interest in the atlas and the remaining image volumes as the expected feature values of the characteristic features at each point on the centerline of the structure of interest in the atlas.

At step 120, the target image T is affinely registered to the atlas A and a sub-image of the atlas $A^E$ that contains only a region of interest (ROI), so as to obtain a registered target image T' and an affine transformation $\tau^a$. The ROI contains an ear or other anatomical portion of the living subject.

Step 120, in one embodiment, includes the steps of downsampling the target image T in each dimension, affinely registering the downsampled target image to the atlas A to obtain the affine transformation $\tau^a$, identifying the atlas sub-image $A^E$ that contains the ROI in the atlas, cropping the target image T in the ROI, and registering the cropped image to the atlas sub-image $A^E$ using the affine transformation $\tau^a$ at a full resolution so as to obtain the registered target image T'. This two step approach, in which the entire images are registered first at low resolution and then at full resolution on a region of interest, both speeds up the process and improves registration accuracy in the region of the ear.

At step 130, a transformation $\tau^n$ for a non-rigid registration between the registered target image T' and the atlas sub-volume $A^E$ is obtained.

At step 140, each voxel v in the registered target image T' is associated with the expected feature values of the characteristic features in the atlas A using the transformation $\tau^n$. In one embodiment, the step of associating each voxel v in the registered target image T' includes the steps of projecting each point on the centerline of the structure of interest in the atlas A to the registered target image T' using the transformation $\tau^n$, finding a closest projected point for each voxel v in the registered target image T', and setting the expected feature values of the characteristic features in the atlas A as the feature values of the closest projected point for each voxel v in the registered target image T'.

At step 150, a cost matrix is computed at each voxel v. The cost matrix measures the difference between the expected feature values and the feature values computed from the registered target image T' at the voxel v, and characterizes costs for all voxel connections in the registered target image T'.

In one embodiment, the cost matrix comprises the sum of a first cost function, $C_I(x)$, that penalizes voxels whose intensity value departs from the expected intensity values, a second cost function, $C_O(x, \vec{t})$, that favors making a transition in the direction predicted by the structure model, and a third cost function $C_M(x)$, that favors voxels whose intensity values are locally intensity minima.

The first cost function $C_I(x)$ is in the form of:

$$C_I(x) = \beta[|T'(x) - E_I(x)|/2000]^\alpha$$

where T'(x) is an intensity value at a voxel x of the registered target image T', and $E_I(x)$ is an expected intensity value at the voxel x given by the structure model, and where parameters $\alpha=0.5$ with a sensitivity of 30% and $\beta=3.0$ with a sensitivity of 70% for the facial nerve, and $\alpha=2.5$ with a sensitivity of 20% and $\beta=10.0$ with a sensitivity of 40% for chorda, respectively. The term "sensitivity", which is a noun, as used herein, refers to the amount by which a parameter can be changed until the segmentation error becomes unacceptable would improve readability. Here an "unacceptable" segmentation error means a segmentation error superior to about 1.0 mm.

The second cost function $C_O(x, \vec{t})$ is in the form of:

$$C_O(x, \vec{t}) = \beta\left[\left(1 - \frac{\vec{t} \cdot \vec{E}_O(x)}{\|\vec{t}\|\|\vec{E}_O(x)\|}\right)/2\right]^\alpha$$

where $\vec{t}$ is the direction of the transition, and $\vec{E}_O(x)$ is the structure direction predicted by the structure model, and where parameters $\alpha=4.0$ with a sensitivity of 80% and $\beta=1.0$ with a sensitivity of 80% for the facial nerve, and $\alpha=4.0$ with a sensitivity of 80% and $\beta=1.0$ with a sensitivity of 80% for chorda, respectively.

The third cost function $C_M(x)$ is in the form of:

$$C_M(x) = \beta\left[1 - \left(\frac{\#\{y \text{ in } Nbhd(x):T'(y) > T'(x)\}}{\#\{y \text{ in } Nbhd(x)\}}\right)^\alpha\right]$$

where #{y in Nhbd(x):T'(y)>T'(x)} is the number of voxels in the 26 connected neighborhood of x, and where parameters α=2.0 with a sensitivity of 70% and β=1.0 with a sensitivity of 50% for the facial nerve, and α=2.0 with a sensitivity of 70% and β=1.0 with a sensitivity of 40% for chorda, respectively.

At step 160, a starting point and an ending point for the structure of interest in the registered target image T' are localized.

At step 170, a centerline of the structure of interest is computed in the registered target image T' with a minimum cost path algorithm using the cost matrix, the starting point and the ending point.

At step 180, a full structure of the structure of interest is extracted in the registered target image T' by deforming the computed centerline of the structure of interest with a level set algorithm.

In one embodiment, step 180 includes the steps of initializing a contour using the computed centerline of the structure of interest in the registered target image T', generating a speed function, F, that specifies the speed at which the contour evolves along its normal direction, where the contour is the zero level set of an embedding function, φ, which obeys an evolution equation of:

φ+F|∇φ|=0, and and iteratively solving the evolution equation with a predetermined number of times.

The speed function F in one embodiment includes $F_W(x) = exp[\beta E_W(x)^\alpha]$ where $E_W(x)$ is the expected structure width at voxel x predicted by the structure model, and where parameters α=1.0 with a sensitivity of 80% and β=0.7 with a sensitivity of 80% for the facial nerve.

The speed function F further has $F_I(x) = exp[-\beta(|T(x)-E_I(x)|/2000)^\alpha]$ where $E_I(x)$ is the expected structure intensity at voxel x predicted by the structure model, and where parameters α=0.5 with a sensitivity of 80% and β=1.3 with a sensitivity of 60% for the facial nerve.

And at step 190, the extracted full structure in the registered target image T' is projected onto the target image volume T using the affine transformation $\tau^a$, so as to obtain the segmentation of the structure of interest in the target image volume T.

In one embodiment, the method 100 may further have the step of storing the atlas A, the target image volume T and the segmentation of the structure of interest in target image volume T in a digitized format.

In another embodiment, the method 100 may also have the step of displaying the segmentation of the structure of interest in the target image volume T.

Another aspect of the present invention provides a system having a controller. The controller is associated with a computer. The controller is configured to implement the method for automatic segmentation of a structure of interest from a target image volume T containing the structure of interest for percutaneous cochlear implantation, as disclosed above.

The system may further have a data storage device in communication with the controller for storing the atlas A, the target image volume T and the segmentation of the structure of interest in target image volume T, and a display in communication with the controller for displaying the segmentation of the structure of interest in the target image volume T.

Yet another aspect of the present invention provides software stored on a computer readable medium for causing a computing system to perform functions that automatically segment a structure of interest from a target image volume T containing the structure of interest for percutaneous cochlear implantation, as disclosed above.

These and other aspects of the present invention are more specifically described below.

IMPLEMENTATIONS AND EXAMPLES OF THE INVENTION

Without intent to limit the scope of the invention, additional exemplary embodiment and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

In this exemplary example, a multipart model-based segmentation algorithm is presented, which accomplishes automatic segmentation of the facial nerve and chorda tympani and is utilized in various methods and systems according to the embodiments of the present invention. Segmentation results are presented for 10 test ears in 7 image volumes and are compared to manually segmented surfaces. The results show that maximum error in structure wall localization is about 2 voxels for the facial nerve and the chorda, demonstrating that the invented method is robust and accurate.

Data

Two sets of CT image volumes acquired with IRB (Independent Research Board) approval were used in this example. The first set is the training set, and includes a total of 12 CT image volumes, which include 15 ears unaltered by previous surgery. These CT image volumes were all acquired on a Philips Mx8000 IDT 16 scanner. The second set is used as the testing set and includes another 7 CT image volumes, which include 10 ears unaltered by previous surgery. The second set of CT image volumes were acquired from several scanners, including a Philips Mx8000 IDT 16, a Siemens Sensation Cardiac 64, and a Philips Brilliance 64. The first and second sets of CT images were acquired at 120-140 kVp and exposure times of 265-1000 mAs. Typical resolutions for the scans were 768×768×300 voxels with voxel size of approximately 0.3×0.3×0.4 mm$^3$.

Method

A. Construction of a Structure Model

The structure model used in this example includes (i) a centerline of the left facial nerve segmented manually in one reference CT volume (an atlas), (ii) a centerline of the left chorda segmented manually in the same CT volume, and (iii) expected values for three characteristics at each voxel along these structures. A separate model for the right anatomy is not necessary since it can be approximated by reflecting the left model across the mid-sagittal plane without bias due to the symmetry of the left and right anatomy of the human head. The three expected characteristics are (a) the width of the structure $E_W$, (b) the intensity of the centerline $E_I$, and (c) the orientation of the centerline curve $E_O$. The expected values for each of the three structure characteristics have been computed from all 15 ears in the training set as follows.

A.1 Aligning the Images

First, one image volume among the 12 training CT volumes was chosen as the reference volume, which is referred to as an atlas A. Next, all the other training images are affinely registered to the atlas A to correct for large differences in scale and orientation between the volumes. This is performed in three steps. (1) The images are downsampled by a factor of four in each dimension, and transformations are computed by optimizing twelve parameters (translation, rotation, scaling, and skew) using Powell's direction set method and Brent's line search algorithm [12] to maximize the mutual information [13, 14] between the two images, where the mutual information between image A and B is computed as $$MI=H(A)+H(B)-H(A,B), \quad (1)$$

with H(.) the Shannon entropy in one image and H(.,.) the joint entropy between these images. The entropy in the images is estimated as follows:

$$H(I) = -\sum_{i \in A} p_i(i) \log p_i(i), \quad (2)$$

in which $p_i(i)$ is the intensity probability density function, which is estimated using intensity histograms with 64 bins. This step roughly aligns all the image volumes with the atlas. (2) The region of interest (ROI) that contains the ear, which has been manually identified in the atlas volume, is used to crop all ear images. (3) The cropped images are registered to the atlas ear at full resolution, using the same algorithm described above. This two step approach, in which the entire images are registered first at low resolution and then at full resolution on a region of interest, both speeds up the process and improves registration accuracy in the region of the ear.

A.2 Extracting Image Data

To extract feature values from each individual CT volume in the training set, the structures of interest are first segmented by hand (note that manual segmentation is used only for the creation of the structure model). This produces binary structure masks from which a centerline is extracted using a topology preserving voxel thinning algorithm (see for instance Palágyi et al. [15]). At each voxel along the centerlines, the intensity, structure width, and structure orientation are estimated. To estimate the width, the intersection of the mask with a plane perpendicular to the centerline is computed. The structure width is then estimated by averaging the lengths of radii cast in that plane to the edge of the structure mask at rotation intervals of π/8 radians. The orientation of the centerline is estimated using a backward difference of the voxel locations with the exception of the first voxel, where a forward difference is used.

A.3 Determining Correspondence Across Model Images

To establish a correspondence between points on the atlas centerline and points on the centerlines of each other volume, the atlas is registered non-rigidly to each of the other training image volumes. This is done with an intensity-based non-rigid registration algorithm developed and called the Adaptive Basis Algorithm (ABA) [16]. This algorithm models the deformation field that registers the two images as a linear combination of radial basis functions (RBFs) with finite support:

$$v(x) = \sum_{i=1}^{N} c_i \Phi(x - x_i), \quad (3)$$

where x is a coordinate vector in $R^d$, with d being the dimensionality of the images. Φ is one of Wu's compactly supported positive radial basis functions [17], and the $c_i$'s are the coefficients of these basis functions. The $c_i$'s, which maximize the mutual information between the images are computed through an optimization process, combine steepest gradient descent and line minimization. The steepest gradient descent algorithm determines the direction of the optimization. The line minimization calculates the optimal step in this direction.

The algorithm is applied using a multiscale and multi resolution approach. The resolution is related to the spatial resolution of the images. The scale is related to the region of support and the number of basis functions. Typically, the algorithm is started on a low-resolution image with few basis functions with large support. The image resolution is then increased and the support of the basis function decreased. This leads to transformations that become more and more local as the algorithm progresses.

Figure 6:
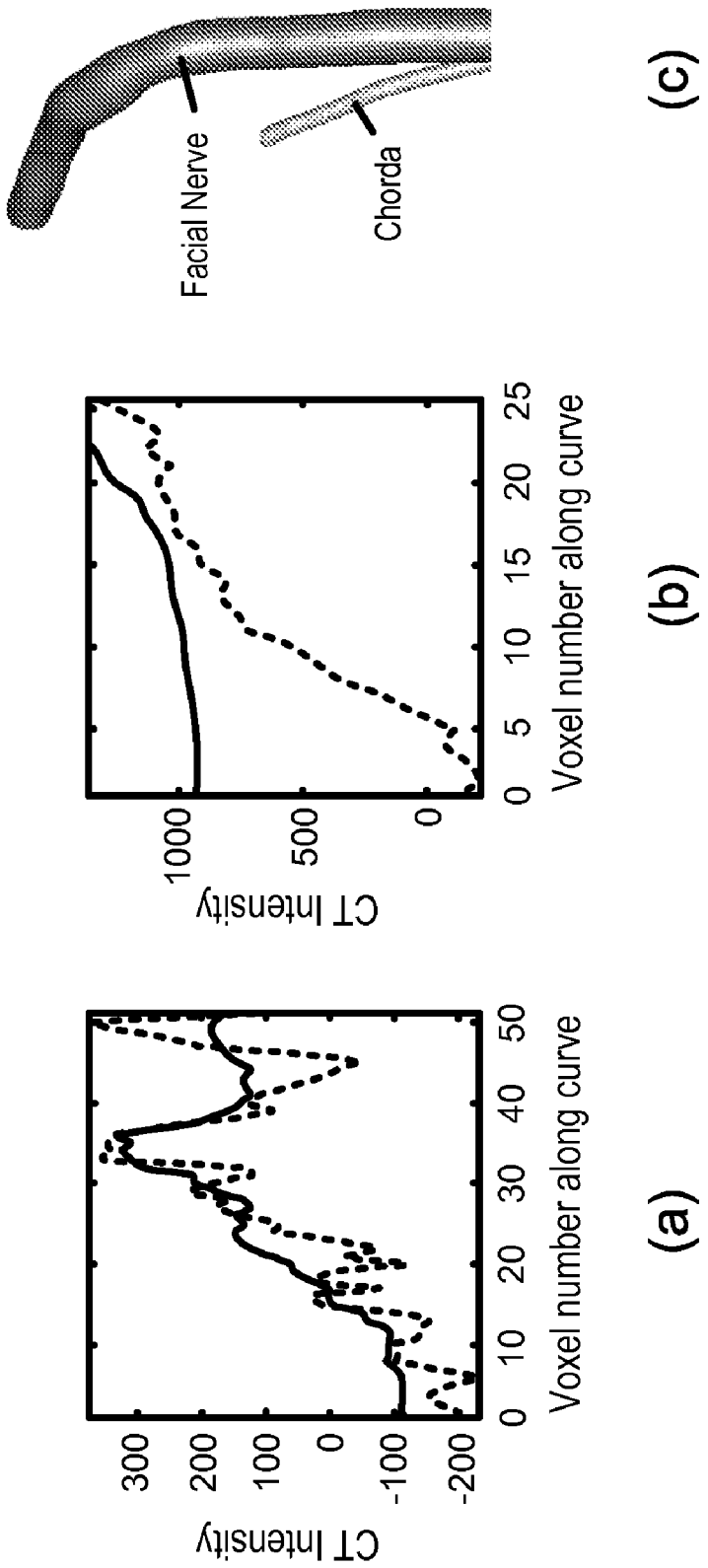
FIG. 6 shows model data: (a) facial nerve and (b) chorda, where the solid lines are mean intensities along the model centerline curve, and the dashed lines are intensities along the centerline curve in the image chosen as an atlas, where the atlas image is seen to differ drastically from the mean in (b), and where a clear change in intensities along the structure is visible, and (c) illustrates the average structure orientation and width.

Once the registration step is completed, each of the points on the atlas centerline is projected onto each of the volumes in the training set using the corresponding non-rigid transformation. The point on a training volume's centerline that is the closest to the projected point is found and a correspondence is established between these two points. For each point on the atlas centerline, this results in 14 corresponding points on the training volumes' centerlines. Note that localizing the closest point on the training volumes' centerline is required because registration is not perfect. As a consequence, the atlas centerline points projected onto the training volumes do not always fall on their centerlines. The expected feature values for each point on the atlas centerline are then computed as the average of the feature values of 15 points (one point in the atlas and 14 corresponding points in the other volumes). The facial nerve and chorda models generated with this method are shown in FIG. 6.

B. Structure Segmentation

Figure 7:
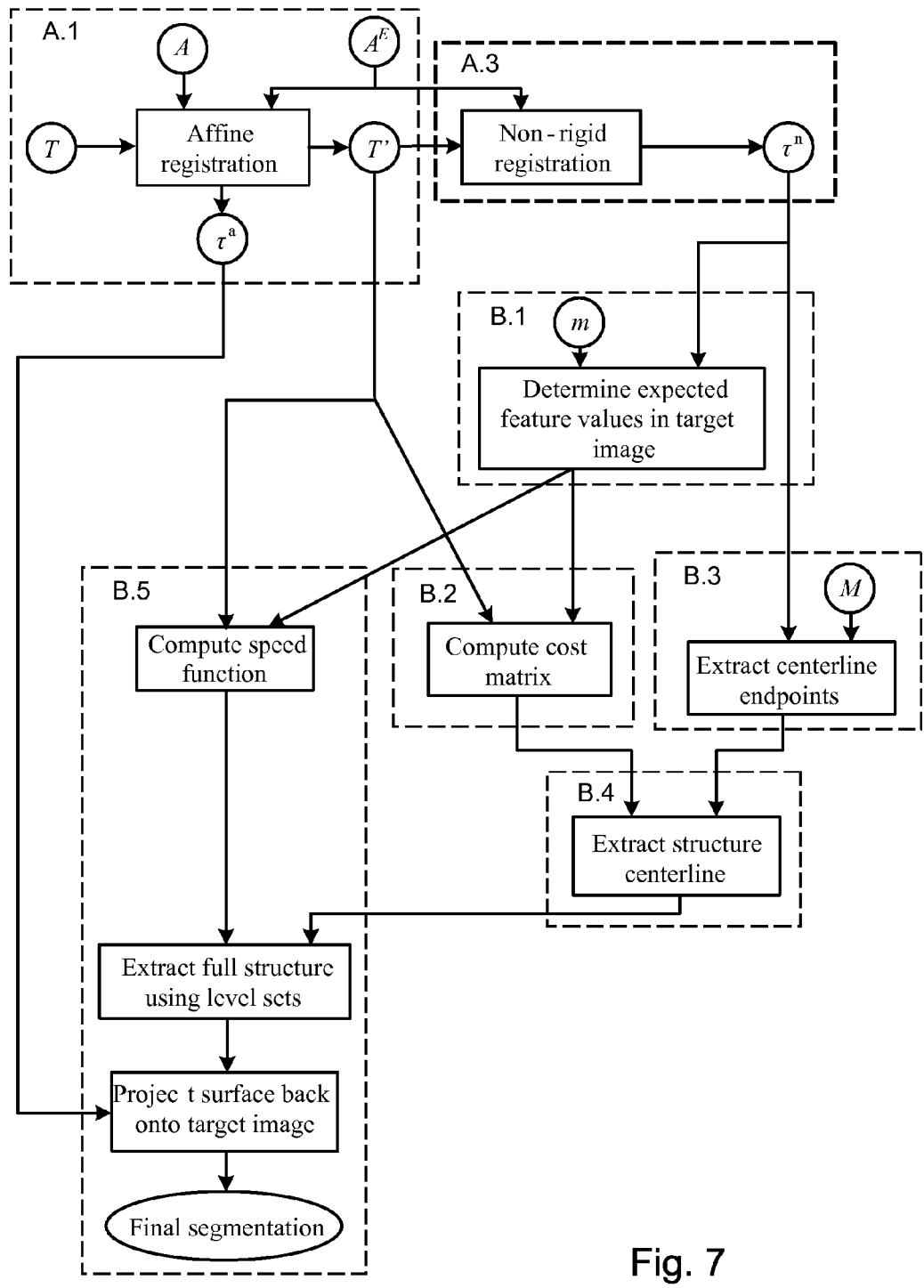
FIG. 7 shows a flow-chart of the segmentation process. Pieces of data are indicated by oval or circular objects, while functional operations are represented by rectangular objects. Each portion of the chart is partitioned according to the section number in the text which details the described methods.

Once the structure model is built, it is used to segment new image volumes. In FIG. 7, a flowchart of the method of segmentation of a target image volume is shown according to one embodiment of the present invention. Dashed boxes in the flowchart refer to sections in which the content of the box is discussed in more detail. In this flowchart, circles indicate an image volume (upper case roman letters), values associated with sets of voxels (lower case roman letters) or a transformation (greek letters). Rectangles are operations performed on the images. T is the target image, i.e., the image to be segmented, A is the entire atlas image, and $A^E$ is an atlas sub-image that only contains the ear region. As discussed in Section A.1, the target image T is affinely registered first to the full atlas volume A and then to the ear sub-volume $A^E$. This results in a registered target image T' and an affine transformation $\tau^a$. A non rigid registration is then computed between the registered target image T' and the ear sub-volume $A^E$ to produce transformation $\tau^n$. Note that segmentation of the structures of interest is performed on the registered target image T'. This rescales and reorients the target image to match the atlas and permits using the a priori structure orientation information stored in the structure model. An alternative would be to register the atlas to the target image but this would necessitate also reorienting the structures' orientation information stored in the model. The transformation $\tau^n$ is used to associate each voxel in the registered target image T' with expected feature values using a method detailed in Section B.1. Using the registered target image T', these expected feature values, and the cost function described in Section B.2, costs are computed for all voxel connections in the range of the registered target image T' and stored in a cost matrix. The starting and ending points for each structure are localized also using the transformation τ'' and masks M with a technique described in Section B.3. Once the cost matrix is computed and the structure extremities localized, the structures' centerlines are computed with a minimum cost path algorithm in Section B.4. Once the centerlines are found, the complete structures are extracted using the method described in Section B.5. A speed function is first generated using expected feature values in the model, which are projected onto the registered target image T'. Next, a level set-based algorithm is utilized to grow the centerlines into full structures. When the structures have been found in the registered target image T', they are projected back to the target image T, which completes the process.

B.1 Cost Matrix for Centerline Segmentation: Concept

Minimum cost path algorithms require two pieces of information: (1) starting and ending points and (2) a cost associated with the transitions from each point to its neighbors. To compute costs based on a-priori information, i.e., intensity and orientation, stored for each point along the path in the atlas image, the following approach is performed. First, the atlas centerline points are projected from the atlas A to the registered target image T' using the transformation τ''. Next, for each voxel in T', the closest projected point is found. The expected feature values for each voxel in T' are then set to be the feature values of the closest projected point. The value of the cost matrix at each voxel v is then simply computed as the difference between the expected feature values and the feature values computed from the image at the voxel v. This approach permits to compensate for small registration errors. For instance, if one centerline atlas point is projected near but not on the structure centerline in T' at point n, and the closest point on the true structure centerline in T' is c, using the scheme, the intensity-based cost associated with point n will be higher than the cost associated with point c, assuming that the structure characteristics in T' are similar to those in the structure model, which is the fundamental assumption of the approach. A minimum cost path algorithm will thus tend to pass through point c rather than point n, which would be on the path obtained if only a non-rigid registration algorithm was used.

B.2 Cost Matrix for Centerline Segmentation: Analytical Expression

The terms that are included in the cost matrix are based on (1) the expected intensity, (2) the expected structure orientation, and (3) local intensity minima in the image. These features were chosen after observation of structure characteristics in a number of CT images. Table 1 shows the exact analytical expression for each term $C_I(x)$, $C_O(x,\vec{t})$ and $C_M(x)$, used in the cost function and lists the value of the parameters used for the facial nerve and the chorda tympani, respectively. The constant terms in these expressions are scaling factors, which have been introduced to map the range of the expressions before multiplication by parameter β and exponentiation by parameter α approximately onto the [0,1] interval. The first term penalizes voxels whose intensity value departs from the expected intensity values. The second term favors making a transition in the direction predicted by the model. In this expression, $\vec{t}$ is the direction of the transition (i.e., up, left, right, etc.), and $\vec{E}_o(x)$ is the structure direction predicted by the model. A transition in the direction predicted by the model has an associated cost of zero while a transition in the opposite direction has an associated cost of one. The third term favors voxels which are local intensity minima. The expression #{y in Nhbd(x):T'(y)>T'(x)} is the number of voxels in the 26 connected neighborhood of x, which have an intensity value that is larger than the intensity value of x. Note that this term is not model-dependent. The overall cost to move from one voxel to the other is the sum of terms (1) and (3) at the new voxel plus the transition cost in that direction. All values are pre-computed before finding the path of minimum cost. The method used to select the parameter values for each structure is discussed in Section D.

TABLE 1

Terms used to compute the costs at every voxel in the image. For each term, the values and sensitivities are shown.

| Cost Function | Purpose | Facial Nerve | | Chorda | |
|---|---|---|---|---|---|
| | | α | β | α | β |
| $C_I(x)$ | Penalize Deviation from Expected Intensity | 0.5\|30% | 3.0\|70% | 2.5\|20% | 10.0\|40% |
| $C_O(x,\vec{t})$ | Penalize Deviation from Expected Curve Orientation | 4.0\|80% | 1.0\|80% | 4.0\|80% | 1.0\|80% |
| $C_M(x)$ | Penalize Deviation form Local Intensity Minima | 2.0\|70% | 1.0\|50% | 2.0\|70% | 1.0\|40% |

$C_I(x)$ is a cost that measures the difference between the image intensity, T'(x), at an arbitrary voxel x and the expected structure intensity, $E_I(x)$, at x given by the structure model, which is in the form of:

$$C_I(x) = \beta[|T'(x) - E_I(x)|/2000]^\alpha \quad (4)$$

$C_O(x,\vec{t})$ is a cost that measures the difference between the expected orientation of the centerline at voxel x and the orientation of a particular connection joining x with a neighboring voxel, which is computed as:

$$C_O(x,\vec{t}) = \beta\left[\left(1 - \frac{\vec{t}\cdot\vec{E}_O(x)}{\|\vec{t}\|\|\vec{E}_O(x)\|}\right)/2\right]^\alpha \quad (5)$$

$C_M(x)$ is a cost that favors voxels on the centerlines of the structures of interest which are locally darker than their neighbors, which is obtained as:

$$C_M(x) = \beta\left[1 - \left(\frac{\#\{y \text{ in } Nbhd(x):T'(y) > T'(x)\}}{\#\{y \text{ in } Nbhd(x)\}}\right)^\alpha\right] \quad (6)$$

B.3. Identifying Starting and Ending Points

In this exemplary embodiment, an atlas-based approach is used to localize the starting and ending points in image T'. First, masks for anatomical structures are manually segmented in the atlas. These masks are then projected onto the image to be segmented, and the extremity points are computed from these projected masks.

To localize the ending and starting points for the facial nerve, a facial nerve mask is delineated in the atlas such that it extends 2 mm outside the facial nerve's segment of interest at each extremity. The starting and ending points for the facial nerve centerline are then chosen as the center of mass of the most inferior 5% of the projected facial nerve mask and the center of mass of the most anterior 5% of the projected facial nerve mask. In all the training images used in this example, this results in starting and ending points that are outside the segment of interest but within 2 mm of the nerve centerline as assessed by manual identification of the facial nerve in the CT scans. The paths thus start and end outside the segment of interest, and the localization of the starting and ending points is relatively inaccurate. However, the path finding algorithm corrects for this inaccuracy within the segment of interest. This makes the approach robust to unavoidable registration errors associated with the localization of the ending and starting points.

The chorda is a structure that branches laterally from the facial nerve at a location that exhibits high inter-patient variability. Thus the chorda mask was created such that the structure extends into the facial nerve 4 mm inferior to its branch from the facial nerve. The starting point for the chorda is then chosen as the most inferior 5% of the projected chorda mask. This point falls outside the segment of interest for the chorda. The path will thus start outside of the ROI but the branching point at which the chorda separates from the facial nerve is, with a high probability, located between the starting and ending points. The other end of the chorda in the segment of interest is placed on the undersurface of the tympanic membrane. But, because the exact location where it joins the membrane is ambiguous in CT images and also exhibits large inter-patient variability, the end point for the chorda segmentation is chosen to be any point within the projected tympanic membrane mask. This accounts for the variability in the final position by assuming that the true final position is the one which corresponds to the path with the smallest total cost.

B.4 Centerline Segmentation

The starting and ending points defined using the approach described in Section B.3 and the cost matrix computed using the methods described in Section B.2 are passed directly to the minimal cost path finding algorithm [18], which returns the final structure centerline segmentation.

B.5 Full Structure Segmentation

Because the chorda is extremely narrow, the chorda segmentation is completed simply by assigning a fixed radius of 0.25 mm along the length of its centerline. For the facial nerve, the centerline produced by the method presented in Section B.4 is used to initialize a full structure segmentation scheme. A standard geometric deformable model, level-set based method is used [19]. In this approach, the contour is the zero level set of an embedding function, $\phi$ which obeys the following evolution equation:

$$\dot{\phi} + F|\nabla\phi| = 0 \tag{7}$$

in which F is the speed function, i.e., the function that specifies the speed at which the contour evolves along its normal direction. The speed function designed for the facial nerve has two components, the analytical expressions, $F_W(x)$ and $F_I(x)$, of which are shown in Table 2. In these expressions $F_W(x)$ and $F_I(x)$, the terms $E_w(x)$ and $E_I(x)$ are the expected width and intensity value at x predicted by the model. The first component $F_W(x)$ is larger when the expected width is greater, and the second component $F_I(x)$ is larger when the intensity in the image is similar to the predicted intensity. The total speed defined at each voxel is the product of the two components $F_W(x)$ and $F_I(x)$ in Table 2. Traditionally, Eq. (7) is solved iteratively until the front stabilizes and stops. This is not possible here because the contrast between the facial nerve and its surrounding structures is weak. To address this issue, Eq. (7) is solved with a fixed number of times (here three times) and the values of $\alpha$ and $\beta$ are chosen such that the propagating front reaches the vessel boundary in three iterations. The method used to select values for $\alpha$ and $\beta$ is discussed in Section D.

TABLE 2

Terms used to compute the speed function at every voxel in the image. For each term, the values and sensitivities are shown.

| Speed Function | Purpose | Facial Nerve | |
|---|---|---|---|
| | | $\alpha$ | $\beta$ |
| $F_W(x)$ | Slow propagation where structure is thinner | 1.0\|80% | 0.7\|80% |
| $F_I(x)$ | Slow propagation where intensities deviate from expectation | 0.5\|80% | 1.3\|60% |

$$F_W(x) = exp[\beta E_W(x)^\alpha] \tag{7}$$

$$F_I(x) = exp[-\beta(|T(x) - E_I(x)|/2000)^\alpha] \tag{8}$$

C. Creation of the Gold Standard and Evaluation of the Method

Gold standards for both the training and testing sets were obtained by manual delineation of these structures. The contours were drawn by a student rater (JHN), then corrected by an experienced physician (FMW, RFL). Contours were drawn only over regions of the structures that were judged to be of clinical significance for planning CI surgery, i.e., only along the length of the structure in the region that is directly in danger of being damaged by the drilling procedure. As a consequence, the most extreme inferior and posterior processes of the facial nerve, and the inferior and superior processes of the chorda are typically not included in the ROI. To quantitatively compare automatic and manual segmentations, surface voxels from structures are first identified. Because portions of the structure model extend beyond the ROI, some voxels are present in the automatic segmentation that fall outside this region. To avoid biasing the quantitative analysis, the portions of the automatic segmentations which lie beyond the manually chosen extrema are eliminated prior to calculations. Thus, the extreme processes of the automatic tubular structures are cropped to match the manual segmentation.

Figure 8:
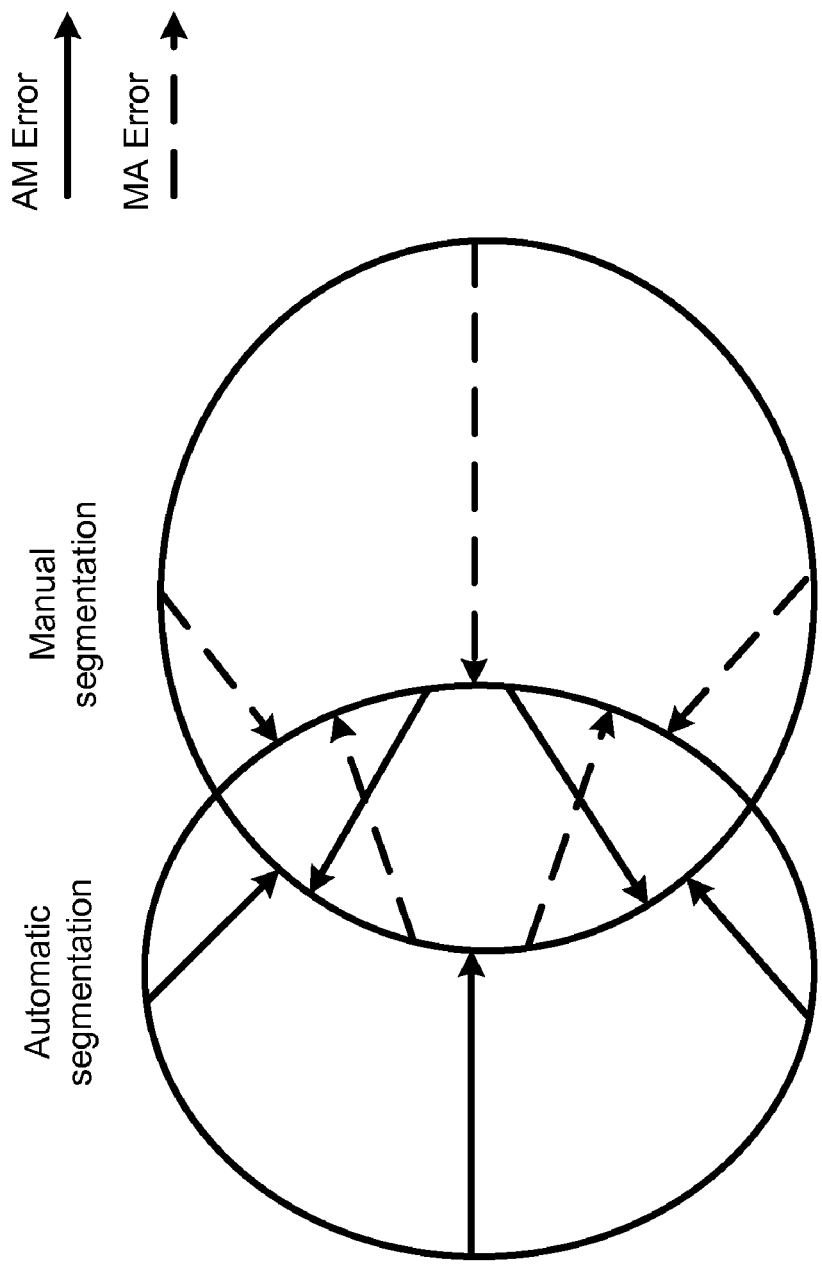
FIG. 8 illustrates a method for calculating error between automatically and manually generated structure surfaces. The AM error along the automatic structure surface is calculated as the closest distance to the manual surface. Similarly, MA error is calculated for the manual surface as the closest distance to the automatically generated surface. Zero error is shown where the contours overlap.

Two distance measures are used to compare similarity between automatic and manual segmentations. For each voxel on the automatic surface, the distance to the closest voxel on the manual surface is computed, which is called as the automatic-manual (AM) error. Similarly, for each voxel on the manual surface, the distance to the closest point on the automatic surface is computed, which is called as the manual-automatic (MA) error. These two types of error are illustrated by a 2D example in FIG. 8; as shown on this Fig. AM(x) is not always equal to MA(x).

D. Parameter Selection

Using the 15 ears in the training set, parameter values were chosen and studied the sensitivity of the algorithm to these values. Parameter selection was done manually and heuristically. For each parameter, an acceptable value was chosen first by visually observing the behavior of the algorithm as a function of parameter values. Once an acceptable value was found, it was modified in the direction that reduced the maximum AM or MA error over all volumes in the training set until a value was found at which the error clearly increased. The final value was chosen away from this point in the generally flat error region, which preceded it. Once values were determined for each parameter, the sensitivity of the resulting parameters was analyzed. This was done by sequentially modifying the parameter values in 10% increments around their selected value until the maximum AM or MA error over all volumes in the training set increased above 1 mm. The deviation (in percent) at which this happens is reported in Tables 1 and 2 for each parameter.

E. Implementation and Timing

The presented methods were all coded in C++. Segmentation of the facial nerve and chorda tympani requires approximately 5 minutes on an Intel quad-core 2.4 GHz Xeon processor, Windows Server 2003 based machine.

F. Evaluation

Once chosen, the parameter values were frozen and the algorithm was applied, without modification, to the 10 ears included in the testing set.

Results

The methods disclosed herein have been tested on 10 ears of 7 CT image volumes. First, the various parameters used in this exemplary embodiment were selected experimentally. The segmentation results were compared to volumes created from manually drawn structure contours. The contours were drawn by a student rater, then corrected by an experienced physician. Contours were placed only in the professionally judged region of interest for the purpose of planning CI surgery, i.e., only in the portions of the structures that are directly in danger of damage from the drilling procedure of CI surgery. Quantitative results for the automatically generated structures within the region of interest were compiled in the following manner. Surface voxels for the manually and automatically segmented structures were identified, and the region of interest is localized using the manually segmented voxels. Only automatically segmented voxels that fall within this region of interest are included in error calculations. The region of interest for the facial nerve was constrained to contain no voxels inferior or anterior to the manual segmentation, since the ends of the facial nerve are extrema in these directions. Because the superior end point of the manual chorda segmentation does not represent the last relevant portion of the structure but only the last position where the chorda is visible in CT, all automatically generated superior chorda voxels are still relevant. The region of interest was thus constrained to contain all voxels placed superiorly to the most inferior voxel in the manual segmentation. The region of interest does not contain any voxels inferior to the manual segmentation, because this is outside of the range that any normal drilling trajectory will pass. For each remaining voxel on the automatic surface, the distance to the closest voxel on the manual surface was computed, which is called as the AM error. Similarly, for each voxel on the manual surface, the distance to the closest point on the automatic surface was computed, which is called as the MA error. Mean, median, and maximum AM and MA errors are shown in Tables 3 and 4. All measurements listed in Tables 3 and 4 are in millimeters and were performed on a voxel by voxel basis. In Tables 3 and 4, Columns Mean Dist. AM, Max Dist. AM and Median Dist. AM are corresponding to the mean, maximum and median distances of the automatically generated structure voxels to the manually segmented voxels, respectively, and Columns Mean Dist. MA, Max Dist. MA and Median Dist. MA are corresponding to the mean, maximum and median distances of the manually segmented voxels to the automatically generated structure voxels, respectively. The last row in each of Tables 3 and 4 contains mean, max, and median values for voxels from all ears.

TABLE 3

Facial nerve segmentation results.
Facial Nerve

| Image Volume | Ear | Mean Dist. AM | Max Dist. AM | Median Dist. AM | Mean Dist. MA | Max Dist. MA | Median Dist. MA |
|---|---|---|---|---|---|---|---|
| 1 | L | 0.103 | 0.487 | 0.000 | 0.085 | 0.468 | 0.000 |
| 2 | R | 0.093 | 0.438 | 0.000 | 0.128 | 0.400 | 0.000 |
| 3 | L | 0.140 | 0.492 | 0.246 | 0.121 | 0.470 | 0.000 |
| 4 | L | 0.093 | 0.521 | 0.000 | 0.104 | 0.477 | 0.000 |
|   | R | 0.146 | 0.800 | 0.000 | 0.215 | 0.838 | 0.260 |
| 5 | L | 0.175 | 0.524 | 0.234 | 0.138 | 0.469 | 0.234 |
|   | R | 0.161 | 0.557 | 0.234 | 0.124 | 0.469 | 0.000 |
| 6 | L | 0.126 | 0.618 | 0.206 | 0.147 | 0.509 | 0.206 |
|   | R | 0.159 | 0.651 | 0.206 | 0.149 | 0.509 | 0.206 |
| 7 | L | 0.122 | 0.400 | 0.000 | 0.195 | 0.738 | 0.000 |
| Overall Statistics |   | 0.132 | 0.800 | 0.103 | 0.141 | 0.838 | 0.000 |

TABLE 4

Chorda segmentation results.
Chorda

| Image Volume | Ear | Mean Dist. AM | Max Dist. AM | Median Dist. AM | Mean Dist. MA | Max Dist. MA | Median Dist. MA |
|---|---|---|---|---|---|---|---|
| 1 | L | 0.349 | 0.689 | 0.344 | 0.224 | 0.630 | 0.122 |
| 2 | R | 0.207 | 0.438 | 0.310 | 0.199 | 0.438 | 0.310 |
| 3 | L | 0.156 | 0.348 | 0.246 | 0.043 | 0.246 | 0.000 |
| 4 | L | 0.179 | 0.582 | 0.260 | 0.114 | 0.544 | 0.000 |
|   | R | 0.212 | 0.582 | 0.260 | 0.026 | 0.260 | 0.000 |
| 5 | L | 0.082 | 0.381 | 0.000 | 0.079 | 0.469 | 0.000 |
|   | R | 0.095 | 0.234 | 0.000 | 0.054 | 0.332 | 0.000 |
| 6 | L | 0.153 | 0.634 | 0.206 | 0.111 | 0.600 | 0.000 |
|   | R | 0.120 | 0.364 | 0.206 | 0.100 | 0.600 | 0.000 |
| 7 | L | 0.055 | 0.400 | 0.000 | 0.053 | 0.369 | 0.000 |
| Overall Statistics |   | 0.161 | 0.689 | 0.226 | 0.100 | 0.630 | 0.000 |

Figure 9:
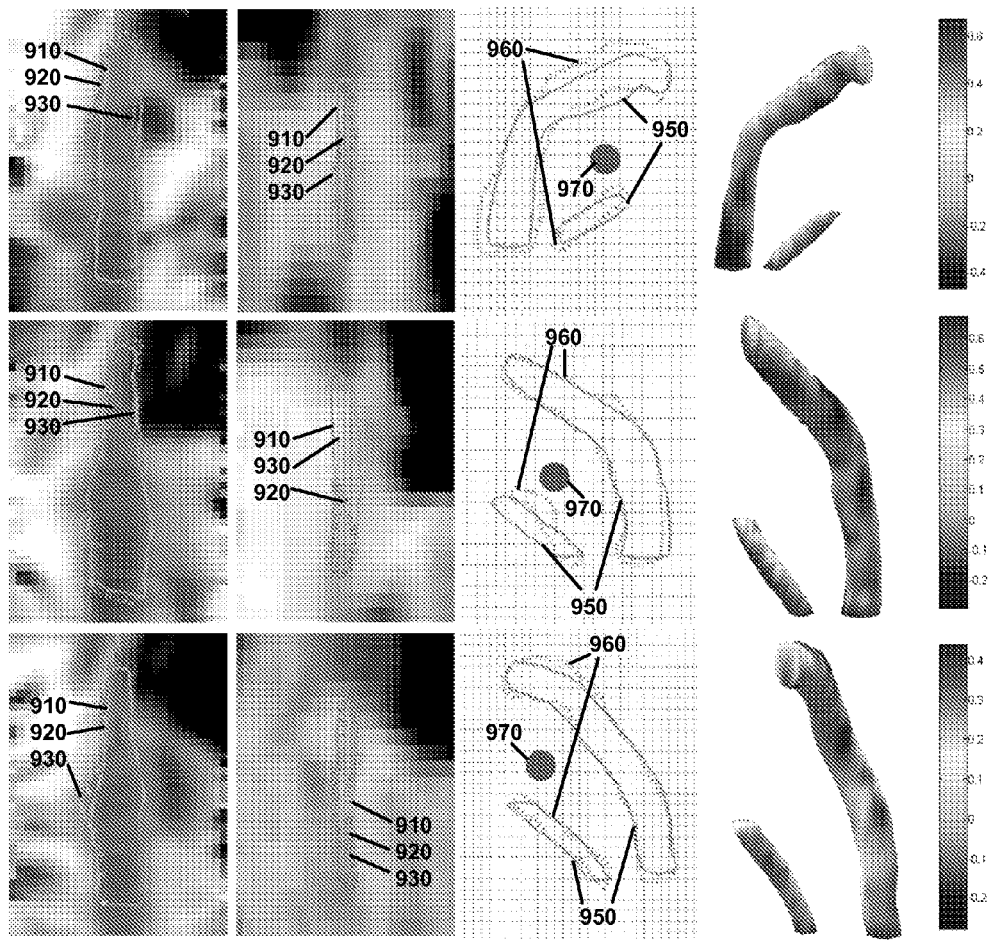
FIG. 9 illustrates segmentation results for CT volumes 4-R (top row), 1-L (middle row), and 3-L (bottom row). From left to right, the first and second columns show a 2D cross-section of automatic segmentation (solid line 910) of the facial nerve and chorda, where the axis of the structure was unwound into a vertical line, and the surfaces and image intensities were interpolated to match that transformation. Also shown are the contour representing the manual segmentation in plane with the automatic contour (wide dotted line 920), and the silhouette of the manual segmentation contour projected over the entire out of plane dimension (thin dotted line 930). The third column shows a 2D projection view of the silhouette around the automatic segmentation (solid contour 950) and around the manual segmentation (dotted contour 960) along the path of a typical drilling trajectory (circle 970 with diameter of 1.0 mm) of the facial nerve and chorda. The final column shows 3D renderings of the automatically segmented structures colored according to the closest distance to the corresponding manually segmented structures. The colorbar maps the colors to distances in millimeters. A negative distance implies the automatic surface is inside the manual one, and vice versa for a positive distance values.

Segmentation results for 3 cases are shown in FIG. 9, which includes the case exhibiting the worst facial nerve error (4-R, which represents right ear (R) in image volume 4), the case exhibiting the worst chorda error (1-L), and lastly a case with very little all around error (3-L). In FIG. 9, the first two columns visualize the facial nerve (first column) and the chorda tympani (second column) in gray level images. To generate these figures, the 3D medial axis of the automatically segmented structures was mapped onto a straight line using thin-plate splines. The images show the intensity values in a plane passing through the straightened center lines. This permits to show the entire length of the structures in a single 2D image. The solid green and purple dashed lines are the intersections of the automatic and manual surfaces with the image plane, respectively. Small differences between the manual and automatic centerlines, as is the case for the second chorda, will cause the manual surface to only partially intersect the image plane. The thin dashed cyan lines are the contours of the projection of the manual surface on the image plane. The third column shows the silhouette of the facial nerve and chorda tympani on a plane perpendicular to a typical trajectory, i.e., the contour of the structures' projection on this plane. The purple and green contours correspond to the manually and automatically segmented structures, respectively. The red dots in these images are the cross sections of the drilling trajectory. The grid lines are spaced according to the size of one voxel (about 0.35×0.4 mm²). The fourth column shows the surface of the automatically segmented structures. The color map encodes the distance between this surface and the closest point on the manually segmented surface in millimeters. In this figure, the distance is negative when the automatic surface is inside the manual surface. It is positive when it is outside.

Discussion

The method requires selecting a number of parameters (10 for the facial nerve and 6 for the chorda). Although, at the present time, this requires initial manual adjustment, the study shows that the method is not very sensitive to the selection of these parameters. Any of the parameters can be changed by 20% before the segmentation error reaches 1 mm. Several of these parameters can be changed by 80% or more. The results also show that the method is robust. The algorithm has been trained on 12 CT volumes (15 ears) acquired at Vanderbilt University on the same scanner. It was tested without modification on 7 additional CT volumes (10 ears) acquired both at Vanderbilt University and at other institutions on different scanners. Results also show that the proposed method is accurate. The mean AM and MA errors are on the order of 0.1 mm for the facial nerve and slightly higher for the chorda. Maximum errors are on the order of 0.8 mm for the facial nerve and 0.7 mm for the chorda. Note that these errors are differences between manual and automatic segmentation. FIG. 9 shows that the largest errors in the chorda segmentation occur at the superior end of the structure, where it exits the tympanic bone. Precise and consistent localization of this point is very difficult even manually. Manual contouring of the facial nerve is also difficult, leading to contour discontinuities between slices. This is especially acute when the nerve is surrounded by structures with similar intensities. This is apparent in FIG. 9 where the automatic contours are generally smoother than the manual ones. It is thus possible that the automatic segmentation is, in fact, more accurate than the manual one. FIG. 9 also shows that the segmentation errors are generally not larger in areas that matter most (i.e., along the drilling trajectory) than they are in other regions of the structure, thus suggesting that the method can be used to generate reliable surfaces to be used for surgical planning.

CONCLUSIONS

The present invention, among other things, presents a method for the automatic segmentation of two critical structures for cochlear implant surgery: the facial nerve and the chorda tympani. Because of the shape and size of these structures, and because of the lack of contrast between these and surrounding structures, accurate segmentation is challenging. It is known that purely atlas-based methods are ineffectual for this problem. Computing transformations that are elastic enough to compensate for anatomic variations leads to transformations that are not constrained enough to deform the structures of interest in a physically plausible way. More constrained transformations lead to results that are not accurate enough for the needs. It has been shown that the use of an optimal path finding algorithm based purely on intensity was also unsuccessful. Even if starting and ending points are chosen manually, changes in intensity along the structures, lack of intensity gradients between the structures of interest and background structures, and incorrect paths of similar intensity from starting to ending points led to inaccurate segmentations.

The solution lies in providing the optimal path finding algorithm with expected feature values. These can be provided with an atlas-based approach because a perfect registration is not required. An approximate registration is sufficient to provide the algorithm with the expected feature values for centerline voxels in a region. The optimal path algorithm then chooses the path that contains voxels associated with feature values that are similar to the expected features.

Another novel element of the approach is a spatially varying speed function also defined using a model. This speed function is then used to drive a geometric deformable model and segment the complete facial nerve. Traditional geometric deformable model approaches involve the definition of a speed function that stops the front at the edge of the structures of interest. A common problem is the issue of leakage when edges are poorly defined. The solution developed is to design a speed function that evolves the front from the centerline to the structure edges in a fixed number of steps. As shown in the results this approach is robust and accurate.

Finally, although the analytical form of the cost function that is used is application specific, the concept of using atlas information to guide an optimum path finding algorithm is generic. The inventors are currently applying the same idea to the segmentation of the optic nerves and tracts in MR images and exploring its applicability to the segmentation of white matter tracts in Diffusion Tensor Images.

In sum, the present invention, among other things, discloses a method of automatic segmentation of the facial nerve and chorda tympani. The method combines an atlas-based approach with a minimum cost path finding algorithm. The atlas is used to create a spatially varying cost function that includes geometric information. A three-dimension minimum cost path is computed using the cost function, which is used to extract the centerline of the facial nerve and of the chorda. The centerlines are then expanded into the full structures using a level-set algorithm with a spatially-varying speed function, so as to segment of the structure of interest.

Accordingly, in one aspect, the present invention relates to a method for automatic segmentation of a structure of interest from a target image volume T containing the structure of interest for percutaneous cochlear implantation. The structure of interest comprises the facial nerve and the chorda tympani of a living subject. The target image volume is characterized with a plurality of voxels.

In one embodiment, the method includes the step of providing a statistical model of the structure of interest. The statistical model comprises a centerline of the structure of interest in an atlas A with each point along the centerline being associated with expected values for characteristic features. The characteristic features comprise a structure width $E_W$, a centerline intensity $E_I$, and a centerline curve orientation $E_O$.

The statistical model of the structure of interest is constructed from a plurality of image volumes pre-operatively acquired from the heads of a plurality of living subjects as follows: at first, one image volume is chosen from the plurality of image volumes as an atlas. Secondly, each of the remaining image volumes of the plurality of image volumes aligned to the atlas to correct differences in scale and orientation between the remaining image volumes. In one embodiment, the aligning step is performed by downsampling an image volume to be registered by a factor of four in each dimension, computing a transformation between the image volume and the atlas using a mutual information-based algorithm so as to initially align the image volume with the atlas, manually identifying the ROI in the atlas, cropping the image volume in the ROI, and registering the cropped image to the ROI of the atlas using the computed transformation at a full resolution.

Thirdly, a structure of interest is manually segmented in each of the atlas and the remaining image volumes to produce corresponding binary structure masks, and a centerline of the structure of interest is extracted from the corresponding binary structure mask in each of the atlas and the remaining image volumes. In one embodiment, the centerline of the structure of interest is extracted with a topology preserving voxel thinning algorithm. Values of the characteristic features are then estimated for each voxel along the centerline of the structure of interest in each of the atlas and the remaining image volumes.

Next, the atlas is registered to each of the remaining image volumes using an intensity-based non-rigid registration algorithm to obtain a corresponding non-rigid transformation, and each point on the centerline of the structure of interest in the atlas is projected onto each of the remaining image volumes using the corresponding non-rigid transformation to establish a correspondence between each projected point and its closest point on the centerline of the structure of interest in each of the remaining image volumes.

Then, the values of the characteristic features are averaged for each point on the centerlines of the structure of interest in the atlas and the remaining image volumes as the expected feature values of the characteristic features at each point on the centerline of the structure of interest in the atlas.

Furthermore, the method includes the steps of affinely registering the target image T to the atlas A and a sub-image of the atlas $A^E$ that contains only a region of interest (ROI), so as to obtain a registered target image T' and an affine transformation $\tau^a$, obtaining a transformation $\tau^n$ for a non-rigid registration between the registered target image T' and the atlas sub-volume $A^E$, and associating each voxel v in the registered target image T' with the expected feature values of the characteristic features in the atlas A using the transformation $\tau^n$. The ROI contains an ear of the living subject.

In one embodiment, the step of affinely registering the target image T includes the steps of downsampling the target image T in each dimension, affinely registering the downsampled target image to the atlas A to obtain the affine transformation $\tau^a$, identifying the atlas sub-image $A^E$ that contains the ROI in the atlas, cropping the target image T in the ROI, and registering the cropped image to the atlas sub-image $A^E$ using the affine transformation $\tau^a$ at a full resolution so as to obtain the registered target image T'.

In one embodiment, the step of associating each voxel v in the registered target image T' comprises the steps of projecting each point on the centerline of the structure of interest in the atlas A to the registered target image T' using the transformation $\tau^n$, finding a closest projected point for each voxel v in the registered target image T', and setting the expected feature values of the characteristic features in the atlas A as the feature values of the closest projected point for each voxel v in the registered target image T'.

Moreover, the method includes the steps of computing a cost matrix at each voxel v that measures the difference between the expected feature values and the feature values computed from the registered target image T' at the voxel v, and characterizes costs for all voxel connections in the registered target image T', localizing a starting point and an ending point for the structure of interest in the registered target image T', and computing a centerline of the structure of interest in the registered target image T' with a minimum cost path algorithm using the cost matrix, the starting point and the ending point.

In one embodiment, the cost matrix comprises the sum of a first cost function, $C_I(x)$, which penalizes voxels whose intensity value departs from the expected intensity values, a second cost function, $C_O(x, \vec{t})$, which favors making a transition in the direction predicted by the structure model, and a third cost function $C_M(x)$, which favors voxels whose intensity values are locally intensity minima.

In one embodiment, the first cost function $C_I(x)$ is in the form of:

$$C_I(x) = \beta[|T'(x) - E_I(x)|/2000]^\alpha$$

where T'(x) is an intensity value at a voxel x of the registered target image T', and $E_I(x)$ is an expected intensity value at the voxel x given by the structure model, and where parameters $\alpha=0.5$ with a sensitivity of 30% and $\beta=3.0$ with a sensitivity of 70% for the facial nerve, and $\alpha=2.5$ with a sensitivity of 20% and $\beta=10.0$ with a sensitivity of 40% for chorda, respectively.

The second cost function $C_O(x, \vec{t})$ is in the form of:

$$C_O(x, \vec{t}) = \beta\left[\left(1 - \frac{\vec{t} \cdot \vec{E}_O(x)}{\|\vec{t}\|\|\vec{E}_O(x)\|}\right)/2\right]^\alpha$$

where $\vec{t}$ is the direction of the transition, and $\vec{E}_O(x)$ is the structure direction predicted by the structure model, and where parameters $\alpha=4.0$ with a sensitivity of 80% and $\beta=1.0$ with a sensitivity of 80% for the facial nerve, and $\alpha=4.0$ with a sensitivity of 80% and $\beta=1.0$ with a sensitivity of 80% for chorda, respectively.

The third cost function $C_M(x)$ is in the form of:

$$C_M(x) = \beta\left[1 - \left(\frac{\#\{y \text{ in } Nbhd(x) : T'(y) > T'(x)\}}{\#\{y \text{ in } Nbhd(x)\}}\right)^\alpha\right]$$

where $\#\{y \text{ in } Nhbd(x):T'(y)>T'(x)\}$ is the number of voxels in the 26 connected neighborhood of x, and where parameters $\alpha=2.0$ with a sensitivity of 70% and $\beta=1.0$ with a sensitivity of 50% for the facial nerve, and $\alpha=2.0$ with a sensitivity of 70% and $\beta=1.0$ with a sensitivity of 40% for chorda, respectively.

Additionally, the method includes the steps of extracting a full structure of the structure of interest in the registered target image T' by deforming the computed centerline of the structure of interest with a level set algorithm, and projecting the extracted full structure in the registered target image T' onto the target image volume T using the affine transformation $\tau^a$, so as to obtain the segmentation of the structure of interest in the target image volume T.

In one embodiment, the step of extracting the full structure of the structure of interest in the registered target image T' has the steps of initializing a contour using the computed centerline of the structure of interest in the registered target image T', generating a speed function, F, that specifies the speed at which the contour evolves along its normal direction, where the contour is the zero level set of an embedding function, $\phi$, which obeys an evolution equation of:

$$\dot{\phi} + F|\nabla\phi| = 0, \text{ and}$$

iteratively solving the evolution equation with a predetermined number of times.

The speed function F in one embodiment includes $$F_W(x) = \exp[\beta E_W(x)^\alpha]$$

where $E_W(x)$ is the expected structure width at voxel x predicted by the structure model, and where parameters $\alpha=1.0$ with a sensitivity of 80% and $\beta=0.7$ with a sensitivity of 80% for the facial nerve.

The speed function F further has $$F_I(x) = \exp[-\beta(|T(x)-E_I(x)|/2000)^\alpha]$$

where $E_I(x)$ is the expected structure intensity at voxel x predicted by the structure model, and where parameters $\alpha=0.5$ with a sensitivity of 80% and $\beta=1.3$ with a sensitivity of 60% for the facial nerve.

In one embodiment, the method may further have the step of storing the atlas A, the target image volume T and the segmentation of the structure of interest in target image volume T in a digitized format.

In another embodiment, the method may also have the step of displaying the segmentation of the structure of interest in the target image volume T.

In another aspect, the present invention relates to a system for automatic segmentation of a structure of interest from a target image volume T containing the structure of interest for percutaneous cochlear implantation. The structure of interest comprises the facial nerve and the chorda tympani of a living subject. The target image volume is characterized with a plurality of voxels. In one embodiment, the system has a controller configured to perform functions of:

(a) providing a statistical model of the structure of interest, where the statistical model comprises a centerline of the structure of interest in an atlas A with each point along the centerline being associated with expected values for characteristic features, and where the characteristic features comprise a structure width $E_W$, a centerline intensity $E_I$, and a centerline curve orientation $E_O$;

(b) affinely registering the target image T to the atlas A and a sub-image of the atlas $A^E$ that contains only a region of interest (ROI), so as to obtain a registered target image T' and an affine transformation $\tau^a$;

(c) obtaining a transformation $\tau^n$ for a non-rigid registration between the registered target image T' and the atlas sub-volume $A^E$;

(d) associating each voxel v in the registered target image T' with the expected feature values of the characteristic features in the atlas A using the transformation $\tau^n$;

(e) computing a cost matrix at each voxel v that measures the difference between the expected feature values and the feature values computed from the registered target image T' at the voxel v, and characterizes costs for all voxel connections in the registered target image T';

(f) localizing a starting point and an ending point for the structure of interest in the registered target image T';

(g) computing a centerline of the structure of interest in the registered target image T' with a minimum cost path algorithm using the cost matrix, the starting point and the ending point;

(h) extracting a full structure of the structure of interest in the registered target image T' by deforming the computed centerline of the structure of interest with a level set algorithm; and (i) projecting the extracted full structure in the registered target image T' onto the target image volume T using the affine transformation $\tau^a$, so as to obtain the segmentation of the structure of interest in the target image volume T.

In one embodiment, the statistical model of the structure of interest is constructed from a plurality of image volumes pre-operatively acquired from the heads of a plurality of living subjects by:

(i) choosing one image volume from the plurality of image volumes as an atlas;

(ii) aligning each of the remaining image volumes of the plurality of image volumes to the atlas to correct differences in scale and orientation between the remaining image volumes;

(iii) manually segmenting a structure of interest in each of the atlas and the remaining image volumes to produce corresponding binary structure masks;

(iv) extracting a centerline of the structure of interest from the corresponding binary structure mask in each of the atlas and the remaining image volumes;

(v) estimating values of the characteristic features for each voxel along the centerline of the structure of interest in each of the atlas and the remaining image volumes;

(vi) registering the atlas to each of the remaining image volumes using an intensity-based non-rigid registration algorithm to obtain a corresponding non-rigid transformation;

(vii) projecting each point on the centerline of the structure of interest in the atlas onto each of the remaining image volumes using the corresponding non-rigid transformation to establish a correspondence between each projected point and its closest point on the centerline of the structure of interest in each of the remaining image volumes; and (viii) averaging the values of the characteristic features for each point on the centerlines of the structure of interest in the atlas and the remaining image volumes as the expected feature values of the characteristic features at each point on the centerline of the structure of interest in the atlas.

In one embodiment, the cost matrix comprises the sum of a first cost function, $C_I(x)$, which penalizes voxels whose intensity value departs from the expected intensity values, a second cost function, $C_O(x, \vec{t})$, which favors making a transition in the direction predicted by the structure model and a third cost function $C_M(x)$, which favors voxels whose intensity values are locally intensity minima.

In one embodiment, the controller is further configured to perform functions of initializing a contour using the computed centerline of the structure of interest in the registered target image T', generating a speed function, F, that specifies the speed at which the contour evolves along its normal direction, where the contour is the zero level set of an embedding function, $\phi$, which obeys an evolution equation of:

$$\dot{\phi} + F|\nabla\phi| = 0,$$

and iteratively solving the evolution equation with a predetermined number of times so as to extracting the full structure of the structure of interest in the registered target image T'.

In one embodiment, the controller is associated with a computer.

The system may further have a data storage device in communication with the controller for storing the atlas A, the target image volume T and the segmentation of the structure of interest in target image volume T, and a display in communication with the controller for displaying the segmentation of the structure of interest in the target image volume T.

In yet another aspect, the present invention relates to software stored on a computer readable medium for causing a computing system to perform functions that automatically segment a structure of interest from a target image volume T containing the structure of interest for percutaneous cochlear implantation, where the structure of interest comprises the facial nerve and the chorda tympani of a living subject, and where the target image volume is characterized with a plurality of voxels. In one embodiment, the functions include:

(a) providing a statistical model of the structure of interest, where the statistical model comprises a centerline of the structure of interest in an atlas A with each point along the centerline being associated with expected values for characteristic features, and where the characteristic features comprise a structure width $E_W$, a centerline intensity $E_I$, and a centerline curve orientation $E_O$;

(b) affinely registering the target image T to the atlas A and a sub-image of the atlas $A^E$ that contains only a region of interest (ROI), so as to obtain a registered target image T' and an affine transformation $\tau^a$;

(c) obtaining a transformation $\tau^n$ for a non-rigid registration between the registered target image T' and the atlas sub-volume $A^E$;

(d) associating each voxel v in the registered target image T' with the expected feature values of the characteristic features in the atlas A using the transformation $\tau^n$;

(e) computing a cost matrix at each voxel v that measures the difference between the expected feature values and the feature values computed from the registered target image T' at the voxel v, and characterizes costs for all voxel connections in the registered target image T';

(f) localizing a starting point and an ending point for the structure of interest in the registered target image T';

(g) computing a centerline of the structure of interest in the registered target image T' with a minimum cost path algorithm using the cost matrix, the starting point and the ending point;

(h) extracting a full structure of the structure of interest in the registered target image T' by deforming the computed centerline of the structure of interest with a level set algorithm; and (i) projecting the extracted full structure in the registered target image T' onto the target image volume T using the affine transformation $\tau^a$, so as to obtain the segmentation of the structure of interest in the target image volume T.

In a further aspect, the present invention relates to a method for automatic segmentation of a structure of interest of a living subject from a target image volume, T, containing the structure of interest, where the target image volume T is characterized with a plurality of voxels. In one embodiment, the method includes the step of providing a statistical model of the structure of interest, where the statistical model comprises a centerline of the structure of interest in an atlas, A, with each point along the centerline being associated with expected values for characteristic features, and where the characteristic features comprise a structure width $E_W$, a centerline intensity $E_I$, and a centerline curve orientation $E_O$.

In one embodiment, the statistical model of the structure of interest is constructed from a plurality of image volumes pre-operatively acquired from the heads of a plurality of living subjects by the steps of choosing one image volume from the plurality of image volumes as an atlas, aligning each of the remaining image volumes of the plurality of image volumes to the atlas to correct differences in scale and orientation between the remaining image volumes, manually segmenting a structure of interest in each of the atlas and the remaining image volumes to produce corresponding binary structure masks, extracting a centerline of the structure of interest from the corresponding binary structure mask in each of the atlas and the remaining image volumes, estimating values of the characteristic features for each voxel along the centerline of the structure of interest in each of the atlas and the remaining image volumes, registering the atlas to each of the remaining image volumes using an intensity-based non-rigid registration algorithm to obtain a corresponding non-rigid transformation, projecting each point on the centerline of the structure of interest in the atlas onto each of the remaining image volumes using the corresponding non-rigid transformation to establish a correspondence between each projected point and its closest point on the centerline of the structure of interest in each of the remaining image volumes, and averaging the values of the characteristic features for each point on the centerlines of the structure of interest in the atlas and the remaining image volumes as the expected feature values of the characteristic features at each point on the centerline of the structure of interest in the atlas.

In one embodiment, the aligning step comprises the steps of downsampling an image volume to be registered by a factor of four in each dimension, computing a transformation between the image volume and the atlas using a mutual information-based algorithm so as to initially align the image volume with the atlas, manually identifying the ROI in the atlas, cropping the image volume in the ROI, and registering the cropped image to the ROI of the atlas using the computed transformation at a full resolution.

The method also includes the steps of affinely registering the target image T to the atlas A and a sub-image of the atlas $A^E$ that contains only a region of interest (ROI), so as to obtain a registered target image T' and an affine transformation $\tau^a$, and obtaining a transformation $\tau^n$ for a non-rigid registration between the registered target image T' and the atlas sub-volume $A^E$.

The method also includes the step of projecting the centerline of the structure of interest in the atlas A onto the registered target image T' using the transformation $\tau^n$ so as to associate each voxel v in the registered target image T' with the expected feature values of the characteristic features in the atlas A.

Furthermore, the method includes the step of performing a centerline segmentation of the structure of interest in the registered target image T' by a minimum cost path algorithm using a cost matrix that determines the least cost accumulating path from a start voxel to an end voxel in the registered target image T'. In one embodiment, the cost matrix comprises the sum of a first cost function that penalizes voxels whose intensity value departs from the expected intensity values, a second cost function that favors making a transition in the direction predicted by the structure model, and a third cost function that favors voxels whose intensity values are locally intensity minima.

Moreover, the method also includes the steps of performing a full structure segmentation of the structure of interest in the registered target image T' by deforming the centerline segmentation of the structure of interest, and projecting the full structure segmentation in the registered target image T' onto the target image volume T using the affine transformation $\tau^a$, so as to obtain the segmentation of the structure of interest in the target image volume T.

In one embodiment, the step of performing the full structure segmentation of the structure of interest in the registered target image T' comprises the steps of initializing a contour using the centerline segmentation of the structure of interest in the registered target image T', generating a speed function, F, that specifies the speed at which the contour evolves along its normal direction, where the contour is the zero level set of an embedding function, $\phi$, which obeys an evolution equation of $$\phi_t + F|\nabla\phi| = 0,$$

and iteratively solving the evolution equation with a predetermined number of times.

In yet a further aspect, the present invention relates to a system for automatic segmentation of a structure of interest of a living subject from a target image volume, T, containing the structure of interest, where the target image volume T is characterized with a plurality of voxels. The system has a controller configured to perform functions of:
  (a) providing a statistical model of the structure of interest, where the statistical model comprises a centerline of the structure of interest in an atlas, A, with each point along the centerline being associated with expected values for characteristic features, and where the characteristic features comprise a structure width $E_W$, a centerline intensity $E_I$, and a centerline curve orientation $E_O$;
  (b) affinely registering the target image T to the atlas A and a sub-image of the atlas $A^E$ that contains only a region of interest (ROI), so as to obtain a registered target image T' and an affine transformation $\tau^a$;
  (c) obtaining a transformation $\tau^n$ for a non-rigid registration between the registered target image T' and the atlas sub-volume $A^E$;
  (d) projecting the centerline of the structure of interest in the atlas A onto the registered target image T' using the transformation $\tau^n$ so as to associate each voxel v in the registered target image T' with the expected feature values of the characteristic features in the atlas A;
  (e) performing a centerline segmentation of the structure of interest in the registered target image T' by a minimum cost path algorithm using a cost matrix that determines the least cost accumulating path from a start voxel to an end voxel in the registered target image T'; and
  (f) performing a full structure segmentation of the structure of interest in the registered target image T' by deforming the centerline segmentation of the structure of interest.

In one embodiment, the controller is further configured to perform a function of projecting the full structure segmentation in the registered target image T' onto the target image volume T using the affine transformation $\tau^a$, so as to obtain the segmentation of the structure of interest in the target image volume T.

In one embodiment, the cost matrix comprises the sum of a first cost function that penalizes voxels whose intensity value departs from the expected intensity values, a second cost function that favors making a transition in the direction predicted by the structure model, and a third cost function that favors voxels whose intensity values are locally intensity minima.

In one embodiment, the controller is further configured to perform functions of initializing a contour using the centerline segmentation of the structure of interest in the registered target image T', generating a speed function, F, that specifies the speed at which the contour evolves along its normal direction, where the contour is the zero level set of an embedding function, $\phi$, which obeys an evolution equation of $$\phi + F|\nabla\phi| = 0,$$

and iteratively solving the evolution equation with a predetermined number of times, so as to extract the full structure of the structure of interest in the registered target image T'.

In one aspect, the present invention relates to software stored on a computer readable medium for causing a computing system to perform functions that automatically segment a structure of interest from a target image volume T containing the structure of interest for percutaneous cochlear implantation, and where the target image volume is characterized with a plurality of voxels. The functions includes:
  (a) providing a statistical model of the structure of interest, where the statistical model comprises a centerline of the structure of interest in an atlas, A, with each point along the centerline being associated with expected values for characteristic features, and where the characteristic features comprise a structure width $E_W$, a centerline intensity $E_I$, and a centerline curve orientation $E_O$;
  (b) affinely registering the target image T to the atlas A and a sub-image of the atlas $A^E$ that contains only a region of interest (ROI), so as to obtain a registered target image T' and an affine transformation $\tau^a$;
  (c) obtaining a transformation $\tau^n$ for a non-rigid registration between the registered target image T' and the atlas sub-volume $A^E$;
  (d) projecting the centerline of the structure of interest in the atlas A onto the registered target image T' using the transformation $\tau^n$ so as to associate each voxel v in the registered target image T' with the expected feature values of the characteristic features in the atlas A;
  (e) performing a centerline segmentation of the structure of interest in the registered target image T' by a minimum cost path algorithm using a cost matrix that determines the least cost accumulating path from a start voxel to an end voxel in the registered target image T'; and
  (f) performing a full structure segmentation of the structure of interest in the registered target image T' by deforming the centerline segmentation of the structure of interest.

In one embodiment, the functions further comprises projecting the full structure segmentation in the registered target image T' onto the target image volume T using the affine transformation $\tau^a$, so as to obtain the segmentation of the structure of interest in the target image volume T.

In another aspect, the present invention relates to a method for automatic segmentation of a structure of interest of a living subject from a target image volume containing the structure of interest. In one embodiment, the method has the steps of providing a statistical model of the structure of interest, wherein the statistical model comprises a centerline of the structure of interest in an atlas A with each point along the centerline being associated with expected values for characteristic features, registering the target image to the atlas so as to obtain a registered target image that contains priori structure information of the structure of interest stored in the structure model, projecting the centerline of the structure of interest in the atlas onto the registered target image so as to associate each voxel in the registered target image with the expected feature values of the characteristic features in the atlas, extracting a centerline of the structure of interest in the registered target image by a minimum cost path algorithm, and expanding the extracted centerline into a full structure of the structure of interest in the registered target image using a level-set algorithm.

In one embodiment, the expanding step comprises the steps of initializing a contour using the extracted centerline of the structure of interest in the registered target image T', generating a speed function, F, capable of accumulating spatial and temporal information of a propagating front of the contour, wherein the speed function F specifies the speed at which the contour evolves along its normal direction, wherein the contour is the zero level set of an embedding function, $\phi$, which obeys an evolution equation of $$\phi + F|\nabla\phi| = 0,$$

and iteratively solving the evolution equation with a predetermined number of times, so as to segment the full structure of the structure of interest in the registered target image T'.

In yet another aspect, the present invention relates to a system having a controller for automatic segmentation of a structure of interest of a living subject from a target image volume containing the structure of interest. The controller is configured to perform functions of providing a statistical model of the structure of interest, wherein the statistical model comprises a centerline of the structure of interest in an atlas A with each point along the centerline being associated with expected values for characteristic features, registering the target image to the atlas so as to obtain a registered target image that contains a-priori structure information of the structure of interest stored in the structure model, projecting the centerline of the structure of interest in the atlas onto the registered target image so as to associate each voxel in the registered target image with the expected feature values of the characteristic features in the atlas, extracting a centerline of the structure of interest in the registered target image by a minimum cost path algorithm, and expanding the extracted centerline into a full structure of the structure of interest in the registered target image using a level-set algorithm.

In a further aspect, the present invention relates to software stored on a computer readable medium for causing a computing system to perform functions that automatically segment a structure of interest of a living subject from a target image volume containing the structure of interest. In one embodiment, the functions include providing a statistical model of the structure of interest, wherein the statistical model comprises a centerline of the structure of interest in an atlas A with each point along the centerline being associated with expected values for characteristic features, registering the target image to the atlas so as to obtain a registered target image that contains a-priori structure information of the structure of interest stored in the structure model, projecting the centerline of the structure of interest in the atlas onto the registered target image so as to associate each voxel in the registered target image with the expected feature values of the characteristic features in the atlas, extracting a centerline of the structure of interest in the registered target image by a minimum cost path algorithm, and expanding the extracted centerline into a full structure of the structure of interest in the registered target image using a level-set algorithm.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES LIST

[1]. R. F. Labadie, P. Choudhury, E. Cetinkaya, R. Balachandran, D. S. Haynes, M. Fenlon, S. Juscyzk, J. M. Fitzpatrick, "Minimally-Invasive, Image-Guided, Facial-Recess Approach to the Middle Ear: Demonstration of the Concept of Percutaneous Cochlear Access In-Vitro," *Otol. Neurotol.*, vol. 26, pp. 557-562, 2005.

[2]. Labadie R F, Noble J H, Dawant B M, Balachandran R, Majdani O, Fitzpatrick J M. Clinical Validation of Percutaneous Cochlear Implant Surgery: Initial Report. *Laryngoscope* 2008; 118:1031-9.

[3]. J. M. Fitzpatrick, P. E. Konrad, C. Nickele, E. Cetinkaya, C. Kao, "Accuracy of customized miniature stereotactic platforms", *Stereotactic and Functional Neurosurgery*, vol. 83, pp. 25-31, April 2005.

[4]. J. H. Noble, F. M. Warren, R. F. Labadie, B. M. Dawant, J. M. Fitzpatrick, "Determination of drill paths for percutaneous cochlear access accounting for target positioning error," *Progress in Biomedical Optics and Imaging—Proceedings of SPIE*, v 6509, p 650925, 2007.

[5]. Jun Feng, Horace H. S. Ip, Shuk H. Cheng, "A 3D Geometric Deformable Model for Tubular Structure Segmentation," *MMM*, p. 174, 10th International Multimedia Modelling Conference, 2004.

[6]. Yim, P. J.; Cebral, J. J.; Mullick, R.; Marcos, H. B.; Choyke, P. L. "Vessel surface reconstruction with a tubular deformable model", *IEEE Trans. Med. Imag.*, Vo. 20 No. 12, December 2001 Page(s): 1411-1421.

[7]. Rashindra Manniesing, Max A. Viergever, and Wiro J. Niessen, "Vessel Axis Tracking Using Topology Constrained Surface Evolution", *IEEE Trans. Med. Imag.*, vol 26, No. 3 March 2007.

[8]. S. Wesarg and E. A. Firle, "Segmentation of vessels: The corkscrew algorithm," in SPIE Medical Imaging: Image Processing, A. Amini and A. Manduca, Eds. Bellingham, Wash.: SPIE, 2004, vol. 5370, pp. 1609-1620.

[9]. Santamaría-Pang A, Colbert C M, Saggau P, Kakadiaris I A., "Automatic centerline extraction of irregular tubular structures using probability volumes from multiphoton imaging", *Med Image Comput Comput Assist Interv Int Conf Med Image Comput Comput Assist Interv.* 2007; 10(Pt 2):486-94.

[10]. S. D. Olabarriaga, M. Breeuwer, and W. J. Niessen, "Minimum cost path algorithm for coronary artery central axis tracking in CT data," in MICCAI, R. E. Ellis and T. M. Peters, Eds., 2003, vol. 2879, pp. 687-694.

[11]. Hanssen, N. Burgielski, Z. Jansen, T. Lievin, M. Ritter, L. von Rymon-Lipinski, B. Keeve, E., "Nerves-level sets for interactive 3D segmentation of nerve channels", Biomedical Imaging: Nano to Macro, 2004. IEEE International Symposium on, April 2004, vol. 1, pp. 201-204.

[12]. W. H. Press, B. P. Flannery, S. A. Teukolsky, and W. T. Vetterling, Numerical Recipes in C, 2nd ed. Cambridge, U. K.: Cambridge Univ. Press, 1992, ch. 10, pp. 412-419.

[13]. F. Maes, A. Collignon, D. Vandermeulen, G. Marchal, P. Suetens, "Multimodality image registration by maximization of mutual information," *IEEE Trans Med Imag.*, vol. 16, pp. 187-198, April 1997.

[14]. W. M. Wells, III, P. Viola, H. Atsumi, S. Nakajima, R. Kikinis, "Multi-modal Volume Registration by Maximization of Mutual Information, *Medical Image Analysis*, vol. 1, pp. 35-51, 1996.

[15]. K. Palágyi and A. Kuba, "A 3-D 6-subiteration thinning algorithm for extracting medial lines," *Pattern Recognit. Lett.*, vol. 19, pp. 613-627, 1998.

[16]. G. K. Rohde, A. Aldroubi, B. M. Dawant, "The adaptive bases algorithm for intensity-based nonrigid image registration", *IEEE Trans. Med. Imag.*, vol. 22, pp. 1470-1479, November 2003.

[17]. Z. Wu, "Multivariate compactly supported positive definite radial functions," Adv. Comput. Math., vol. 4, pp. 283-292, 1995.

[18]. E. W. Dijkstra, "A note on two problems in connexion with graphs," *Numerische Mathematik*, vol. 1, pp. 269-271, 1959.

[19]. J. Sethian, *Level Set Methods and Fast Marching Methods,* 2nd ed. Cambridge, Mass.: Cambridge Univ. Press, 1999.

What is claimed is:

1. A method for automatic segmentation of a structure of interest from a target image volume T containing the structure of interest, wherein the structure of interest comprises the facial nerve and the chorda tympani of a living subject, and wherein the target image volume is characterized with a plurality of voxels, comprising the steps of:
  (a) providing a statistical model of the structure of interest, wherein the statistical model comprises a centerline of the structure of interest in an atlas A with each point along the centerline being associated with expected values for characteristic features, and wherein the characteristic features comprise a structure width $E_W$, a centerline intensity $E_I$, and a centerline curve orientation $E_O$;
  (b) affinely registering the target image volume T to the atlas A and a volume of the sub-image of the atlas $A^E$ that contains only a region of interest (ROI), so as to obtain a registered target image T' and an affine transformation $\tau^a$;
  (c) obtaining a transformation $\tau^n$ for a non-rigid registration between the registered target image T' and the volume of the sub-image of the atlas $A^E$;
  (d) associating each voxel v in the registered target image T' with the expected feature values of the characteristic features in the atlas A using the transformation $\tau^n$;
  (e) computing a cost matrix at each voxel v that measures the difference between the expected feature values and the feature values computed from the registered target image T' at the voxel v, and characterizes costs for all voxel connections in the registered target image T';
  (f) localizing a starting point and an ending point for the structure of interest in the registered target image T';
  (g) computing a centerline of the structure of interest in the registered target image T' with a minimum cost path algorithm using the cost matrix, the starting point and the ending point;
  (h) extracting a full structure of the structure of interest in the registered target image T' by deforming the computed centerline of the structure of interest with a level set algorithm; and
  (i) projecting the extracted full structure in the registered target image T' onto the target image volume T using the affine transformation $\tau^a$, so as to obtain the segmentation of the structure of interest in the target image volume T.

2. The method of claim 1, wherein the statistical model of the structure of interest is constructed from a plurality of image volumes pre-operatively acquired from the heads of a plurality of living subjects by the steps of:
  (i) choosing one image volume from the plurality of image volumes as an atlas;
  (ii) aligning each of the remaining image volumes of the plurality of image volumes to the atlas to correct differences in scale and orientation between the remaining image volumes;
  (iii) manually segmenting a structure of interest in each of the atlas and the remaining image volumes to produce corresponding binary structure masks;
  (iv) extracting a centerline of the structure of interest from the corresponding binary structure mask in each of the atlas and the remaining image volumes;
  (v) estimating values of the characteristic features for each voxel along the centerline of the structure of interest in each of the atlas and the remaining image volumes;
  (vi) registering the atlas to each of the remaining image volumes using an intensity-based non-rigid registration algorithm to obtain a corresponding non-rigid transformation;
  (vii) projecting each point on the centerline of the structure of interest in the atlas onto each of the remaining image volumes using the corresponding non-rigid transformation to establish a correspondence between each projected point and its closest point on the centerline of the structure of interest in each of the remaining image volumes; and
  (viii) averaging the values of the characteristic features for each point on the centerlines of the structure of interest in the atlas and the remaining image volumes as the expected feature values of the characteristic features at each point on the centerline of the structure of interest in the atlas.

3. The method of claim 2, wherein the aligning step comprises the steps of:
  (i) downsampling an image volume to be registered by a factor of four in each dimension;
  (ii) computing a transformation between the image volume and the atlas using a mutual information-based algorithm so as to initially align the image volume with the atlas;
  (iii) manually identifying the ROI in the atlas;
  (iv) cropping the image volume in the ROI; and
  (v) registering the cropped image to the ROI of the atlas using the computed transformation at a full resolution; and
  wherein the centerline of the structure of interest in each of the atlas and the remaining image volumes is extracted with a topology preserving voxel thinning algorithm.

4. The method of claim 1, wherein the step of affinely registering the target image T comprises the steps of:
  (i) downsampling the target image T in each dimension;
  (ii) affinely registering the downsampled target image to the atlas A to obtain the affine transformation $\tau^a$;
  (iii) identifying the atlas sub-image $A^E$ that contains the ROI in the atlas;
  (iv) cropping the target image T in the ROI; and
  (v) registering the cropped image to the atlas sub-image $A^E$ using the affine transformation $\tau^a$ at a full resolution so as to obtain the registered target image T';
  wherein the step of associating each voxel v in the registered target image T' comprises the steps of:
  (i) projecting each point on the centerline of the structure of interest in the atlas A to the registered target image T' using the transformation $\tau^n$;
  (ii) finding a closest projected point for each voxel v in the registered target image T'; and
  (iii) setting the expected feature values of the characteristic features in the atlas A as the feature values of the closest projected point for each voxel v in the registered target image T'; and
  wherein the cost matrix comprises the sum of:
  (i) a first cost function, $C_I(x)$, that penalizes voxels whose intensity value departs from the expected intensity values;
  (ii) a second cost function, $C_O(x, \vec{t})$, that favors making a transition in the direction predicted by the structure model; and (iii) a third cost function $C_M(x)$, that favors voxels whose intensity values are locally intensity minima.

5. The method of claim 4, wherein
the first cost function $C_I(x)$ is in the form of:

$$C_I(x) = \beta[|T'(x) - E_I(x)|/2000]^\alpha$$

wherein T'(x) is an intensity value at a voxel x of the registered target image T', and $E_I(x)$ is an expected intensity value at the voxel x given by the structure model, and wherein parameters α=0.5 with a sensitivity of 30% and β=3.0 with a sensitivity of 70% for the facial nerve, and α=2.5 with a sensitivity of 20% and β=10.0 with a sensitivity of 40% for chorda, respectively;

the second cost function $C_O(x, \vec{t})$ is in the form of:

$$C_O(x, \vec{t}) = \beta\left[\left(1 - \frac{\vec{t} \cdot \vec{E}_O(x)}{\|\vec{t}\|\|\vec{E}_O(x)\|}\right)/2\right]^\alpha$$

wherein $\vec{t}$ is the direction of the transition, and $\vec{E}_O(x)$ is the structure direction predicted by the structure model, and wherein parameters α=4.0 with a sensitivity of 80% and β=1.0 with a sensitivity of 80% for the facial nerve, and α=4.0 with a sensitivity of 80% and β=1.0 with a sensitivity of 80% for chorda, respectively; and the third cost function $C_M(x)$ is in the form of:

$$C_M(x) = \beta\left[1 - \left(\frac{\#\{y \text{ in } Nbhd(x):T'(y) > T'(x)\}}{\#\{y \text{ in } Nbhd(x)\}}\right)^\alpha\right]$$

wherein #{y in Nhbd(x):T'(y)>T'(x)} is the number of voxels in the 26 connected neighborhood of x, and wherein parameters α=2.0 with a sensitivity of 70% and β=1.0 with a sensitivity of 50% for the facial nerve, and α=2.0 with a sensitivity of 70% and β=1.0 with a sensitivity of 40% for chorda, respectively.

6. The method of claim 1, wherein the step of extracting the full structure of the structure of interest in the registered target image T' comprises the steps of:
(i) initializing a contour using the computed centerline of the structure of interest in the registered target image T';
(ii) generating a speed function, F, that specifies the speed at which the contour evolves along its normal direction, wherein the contour is the zero level set of an embedding function, φ, which obeys an evolution equation of:

$$\phi + F|\nabla\phi| = 0; \text{ and}$$

(iii) iteratively solving the evolution equation with a predetermined number of times.

7. The method of claim 6, wherein the speed function F comprises at least one of the following two forms:

$$F_W(x) = exp[\beta E_W(x)^\alpha]$$

wherein $E_W(x)$ is the expected structure width at voxel x predicted by the structure model, and wherein parameters α=1.0 with a sensitivity of 80% and β=0.7 with a sensitivity of 80% for the facial nerve; and $$F_I(x) = exp[-\beta(|T'(x) - E_I(x)|/2000)^\alpha]$$

wherein $E_I(x)$ is the expected structure intensity at voxel x predicted by the structure model, and wherein parameters α=0.5 with a sensitivity of 80% and β=1.3 with a sensitivity of 60% for the facial nerve.

8. The method of claim 1, further comprising the steps of
(i) storing the atlas A, the target image volume T and the segmentation of the structure of interest in target image volume T in a digitized format; and
(ii) displaying the segmentation of the structure of interest in the target image volume T.

9. A system for automatic segmentation of a structure of interest from a target image volume T containing the structure of interest, wherein the structure of interest comprises the facial nerve and the chorda tympani of a living subject, and wherein the target image volume is characterized with a plurality of voxels, comprising a controller configured to perform functions of:
(a) providing a statistical model of the structure of interest, wherein the statistical model comprises a centerline of the structure of interest in an atlas A with each point along the centerline being associated with expected values for characteristic features, and wherein the characteristic features comprise a structure width $E_W$, a centerline intensity $E_I$, and a centerline curve orientation $E_O$;
(b) affinely registering the target image volume T to the atlas A and a volume of the sub-image of the atlas $A^E$ that contains only a region of interest (ROI), so as to obtain a registered target image T' and an affine transformation $\tau^a$;
(c) obtaining a transformation $\tau^n$ for a non-rigid registration between the registered target image T' and the volume of the sub-image of the atlas $A^E$;
(d) associating each voxel v in the registered target image T' with the expected feature values of the characteristic features in the atlas A using the transformation $\tau^n$;
(e) computing a cost matrix at each voxel v that measures the difference between the expected feature values and the feature values computed from the registered target image T' at the voxel v, and characterizes costs for all voxel connections in the registered target image T';
(f) localizing a starting point and an ending point for the structure of interest in the registered target image T';
(g) computing a centerline of the structure of interest in the registered target image T' with a minimum cost path algorithm using the cost matrix, the starting point and the ending point;
(h) extracting a full structure of the structure of interest in the registered target image T' by deforming the computed centerline of the structure of interest with a level set algorithm; and
(i) projecting the extracted full structure in the registered target image T' onto the target image volume T using the affine transformation $\tau^a$, so as to obtain the segmentation of the structure of interest in the target image volume T.

10. The system of claim 9, wherein the statistical model of the structure of interest is constructed from a plurality of image volumes pre-operatively acquired from the heads of a plurality of living subjects by:
(i) choosing one image volume from the plurality of image volumes as an atlas;
(ii) aligning each of the remaining image volumes of the plurality of image volumes to the atlas to correct differences in scale and orientation between the remaining image volumes;
(iii) manually segmenting a structure of interest in each of the atlas and the remaining image volumes to produce corresponding binary structure masks;
(iv) extracting a centerline of the structure of interest from the corresponding binary structure mask in each of the atlas and the remaining image volumes;

(v) estimating values of the characteristic features for each voxel along the centerline of the structure of interest in each of the atlas and the remaining image volumes;

(vi) registering the atlas to each of the remaining image volumes using an intensity-based non-rigid registration algorithm to obtain a corresponding non-rigid transformation;

(vii) projecting each point on the centerline of the structure of interest in the atlas onto each of the remaining image volumes using the corresponding non-rigid transformation to establish a correspondence between each projected point and its closest point on the centerline of the structure of interest in each of the remaining image volumes; and (viii) averaging the values of the characteristic features for each point on the centerlines of the structure of interest in the atlas and the remaining image volumes as the expected feature values of the characteristic features at each point on the centerline of the structure of interest in the atlas.

11. The system of claim 9, wherein the cost matrix comprises the sum of:

(i) a first cost function, $C_I(x)$, that penalizes voxels whose intensity value departs from the expected intensity values;

(ii) a second cost function, $C_O(x, \vec{t})$, that favors making a transition in the direction predicted by the structure model; and (iii) a third cost function $C_M(x)$, that favors voxels whose intensity values are locally intensity minima.

12. The system of claim 9, further comprising:

(i) a data storage device in communication with the controller for storing the atlas A, the target image volume T and the segmentation of the structure of interest in target image volume T; and (ii) a display in communication with the controller for displaying the segmentation of the structure of interest in the target image volume T.

13. A method for automatic segmentation of a structure of interest from a target image volume, T, containing the structure of interest, wherein the target image volume T is characterized with a plurality of voxels, comprising the steps of:

(a) providing a statistical model of the structure of interest, wherein the statistical model comprises a centerline of the structure of interest in an atlas A with each point along the centerline being associated with expected values for characteristic features, and wherein the characteristic features comprise a structure width $E_W$, a centerline intensity $E_I$, and a centerline curve orientation $E_O$;

(b) affinely registering the target image volume T to the atlas A and a volume of the sub-image of the atlas $A^E$ that contains only a region of interest (ROI), so as to obtain a registered target image T' and an affine transformation $\tau^a$;

(c) obtaining a transformation $\tau^n$ for a non-rigid registration between the registered target image T' and the volume of the sub-image of the atlas $A^E$;

(d) projecting the centerline of the structure of interest in the atlas A onto the registered target image T' using the transformation $\tau^n$ so as to associate each voxel v in the registered target image T' with the expected feature values of the characteristic features in the atlas A;

(e) performing a centerline segmentation of the structure of interest in the registered target image T' by a minimum cost path algorithm using a cost matrix that determines the least cost accumulating path from a start voxel to an end voxel in the registered target image T'; and (f) performing a full structure segmentation of the structure of interest in the registered target image T' by deforming the centerline segmentation of the structure of interest.

14. The method of claim 13, further comprising the step of projecting the full structure segmentation in the registered target image T' onto the target image volume T using the affine transformation $\tau^a$, so as to obtain the segmentation of the structure of interest in the target image volume T.

15. The method of claim 13, wherein the statistical model of the structure of interest is constructed from a plurality of image volumes pre-operatively acquired from the heads of a plurality of living subjects by the steps of:

(i) choosing one image volume from the plurality of image volumes as an atlas;

(ii) aligning each of the remaining image volumes of the plurality of image volumes to the atlas to correct differences in scale and orientation between the remaining image volumes;

(iii) manually segmenting a structure of interest in each of the atlas and the remaining image volumes to produce corresponding binary structure masks;

(iv) extracting a centerline of the structure of interest from the corresponding binary structure mask in each of the atlas and the remaining image volumes;

(v) estimating values of the characteristic features for each voxel along the centerline of the structure of interest in each of the atlas and the remaining image volumes;

(vi) registering the atlas to each of the remaining image volumes using an intensity-based non-rigid registration algorithm to obtain a corresponding non-rigid transformation;

(vii) projecting each point on the centerline of the structure of interest in the atlas onto each of the remaining image volumes using the corresponding non-rigid transformation to establish a correspondence between each projected point and its closest point on the centerline of the structure of interest in each of the remaining image volumes; and (viii) averaging the values of the characteristic features for each point on the centerlines of the structure of interest in the atlas and the remaining image volumes as the expected feature values of the characteristic features at each point on the centerline of the structure of interest in the atlas.

16. The method of claim 15, wherein the aligning step comprises the steps of:

(i) downsampling an image volume to be registered by a factor of four in each dimension;

(ii) computing a transformation between the image volume and the atlas using a mutual information-based algorithm so as to initially align the image volume with the atlas;

(iii) manually identifying the ROI in the atlas;

(iv) cropping the image volume in the ROI; and (v) registering the cropped image to the ROI of the atlas using the computed transformation at a full resolution.

17. The method of claim 13, wherein the cost matrix comprises the sum of:

(i) a first cost function that penalizes voxels whose intensity value departs from the expected intensity values;

(ii) a second cost function that favors making a transition in the direction predicted by the structure model; and (iii) a third cost function that favors voxels whose intensity values are locally intensity minima.

18. The method of claim 13, wherein the step of extracting the full structure of the structure of interest in the registered target image T' comprises the steps of:
(i) initializing a contour using the centerline segmentation of the structure of interest in the registered target image T';
(ii) generating a speed function, F, that specifies the speed at which the contour evolves along its normal direction, wherein the contour is the zero level set of an embedding function, φ, which obeys an evolution equation of:

$$\phi_t + F|\nabla\phi| = 0;\text{ and}$$

(iii) iteratively solving the evolution equation with a predetermined number of times.

19. A system for automatic segmentation of a structure of interest from a target image volume, T, containing the structure of interest, wherein the target image volume T is characterized with a plurality of voxels, comprising a controller configured to perform functions of:
(a) providing a statistical model of the structure of interest, wherein the statistical model comprises a centerline of the structure of interest in an atlas A with each point along the centerline being associated with expected values for characteristic features, and wherein the characteristic features comprise a structure width $E_W$, a centerline intensity $E_I$, and a centerline curve orientation $E_O$;
(b) affinely registering the target image volume T to the atlas A and a volume of the sub-image of the atlas $A^E$ that contains only a region of interest (ROI), so as to obtain a registered target image T' and an affine transformation $\tau^a$;
(c) obtaining a transformation $\tau^n$ for a non-rigid registration between the registered target image T' and the volume of the sub-image of the atlas $A^E$;
(d) projecting the centerline of the structure of interest in the atlas A onto the registered target image T' using the transformation $\tau^n$ so as to associate each voxel v in the registered target image T' with the expected feature values of the characteristic features in the atlas A;
(e) performing a centerline segmentation of the structure of interest in the registered target image T' by a minimum cost path algorithm using a cost matrix that determines the least cost accumulating path from a start voxel to an end voxel in the registered target image T'; and
(f) performing a full structure segmentation of the structure of interest in the registered target image T' by deforming the centerline segmentation of the structure of interest.

20. The system of claim 19, wherein the controller is further configured to perform a function of projecting the full structure segmentation in the registered target image T' onto the target image volume T using the affine transformation $\tau^a$, so as to obtain the segmentation of the structure of interest in the target image volume T.

21. The system of claim 19, wherein the controller is further configured to perform functions of:
(i) initializing a contour using the centerline segmentation of the structure of interest in the registered target image T';
(ii) generating a speed function, F, that specifies the speed at which the contour evolves along its normal direction, wherein the contour is the zero level set of an embedding function, φ, which obeys an evolution equation of:

$$\phi_t + F|\nabla\phi| = 0;\text{ and}$$

(iii) iteratively solving the evolution equation with a predetermined number of times, so as to extract the full structure of the structure of interest in the registered target image T'.

22. A method for automatic segmentation of a structure of interest of a living subject from a target image volume containing the structure of interest, comprising the steps of:
(a) providing a statistical model of the structure of interest, wherein the statistical model comprises a centerline of the structure of interest in an atlas A with each point along the centerline being associated with expected values for characteristic features;
(b) registering the target image to the atlas so as to obtain a registered target image that contains a-priori structure information of the structure of interest stored in the structure model;
(c) projecting the centerline of the structure of interest in the atlas onto the registered target image so as to associate each voxel in the registered target image with the expected feature values of the characteristic features in the atlas;
(d) extracting a centerline of the structure of interest in the registered target image by a minimum cost path algorithm; and
(e) expanding the extracted centerline into a full structure of the structure of interest in the registered target image using a level-set algorithm.

23. The method of claim 22, wherein the expanding step comprises the steps of:
(i) initializing a contour using the extracted centerline of the structure of interest in the registered target image T';
(ii) generating a speed function, F, capable of accumulating spatial and temporal information of a propagating front of the contour, wherein the speed function F specifies the speed at which the contour evolves along its normal direction, wherein the contour is the zero level set of an embedding function, φ, which obeys an evolution equation of:

$$\phi_t + F|\nabla\phi| = 0;\text{ and}$$

(iii) iteratively solving the evolution equation with a predetermined number of times, so as to segment the full structure of the structure of interest in the registered target image T'.

24. A system for automatic segmentation of a structure of interest of a living subject from a target image volume containing the structure of interest, comprising a controller configured to perform functions of:
(a) providing a statistical model of the structure of interest, wherein the statistical model comprises a centerline of the structure of interest in an atlas A with each point along the centerline being associated with expected values for characteristic features;
(b) registering the target image to the atlas so as to obtain a registered target image that contains a-priori structure information of the structure of interest stored in the structure model;
(c) projecting the centerline of the structure of interest in the atlas onto the registered target image so as to associate each voxel in the registered target image with the expected feature values of the characteristic features in the atlas;
(d) extracting a centerline of the structure of interest in the registered target image by a minimum cost path algorithm; and (e) expanding the extracted centerline into a full structure of the structure of interest in the registered target image using a level-set algorithm.

* * * * *